United States Patent [19]
Mitsutani

[11] Patent Number: 5,732,553
[45] Date of Patent: Mar. 31, 1998

[54] DEVICE FOR DETERMINING DETERIORATION OF A CATALYTIC CONVERTER FOR AN ENGINE

[75] Inventor: Noritake Mitsutani, Toyota, Japan

[73] Assignee: Toyota Jidosha Kabushiki Kaisha, Toyota, Japan

[21] Appl. No.: 630,764

[22] Filed: Apr. 11, 1996

[30] Foreign Application Priority Data

Apr. 20, 1995 [JP] Japan ................................. 7-095529
Jun. 9, 1995 [JP] Japan ................................. 7-143399

[51] Int. Cl.$^6$ ............................... F01N 3/20; F02D 41/14
[52] U.S. Cl. ........................................... 60/276; 60/277
[58] Field of Search .......................... 60/276, 277, 285

[56] References Cited

U.S. PATENT DOCUMENTS

| | | | |
|---|---|---|---|
| 5,165,230 | 11/1992 | Kayanuma et al. | 60/276 |
| 5,267,472 | 12/1993 | Schneider et al. | 73/118.1 |
| 5,272,872 | 12/1993 | Grutter et al. | 60/274 |
| 5,279,116 | 1/1994 | Shimizu et al. | 60/277 |
| 5,282,383 | 2/1994 | Kayanuma | 73/118.1 |
| 5,301,501 | 4/1994 | Shimizu et al. | 60/274 |
| 5,303,548 | 4/1994 | Shimizu et al. | 60/277 |
| 5,359,853 | 11/1994 | Shimizu | 60/276 |
| 5,375,416 | 12/1994 | Iwata et al. | 60/276 |
| 5,412,941 | 5/1995 | Suzuki et al. | 60/276 |
| 5,462,039 | 10/1995 | Mamiya et al. | 123/686 |
| 5,487,269 | 1/1996 | Atanasyan et al. | 60/274 |

FOREIGN PATENT DOCUMENTS

A-475177  3/1992  European Pat. Off. .

*Primary Examiner*—Tony M. Argenbright
*Attorney, Agent, or Firm*—Oliff & Berridge, PLC

[57] ABSTRACT

The device according to the present invention controls air-fuel ratio of the exhaust gas flowing into the catalytic converter when performing the determination of deterioration of the catalytic converter in such a manner that the amount of oxygen released from a three-way catalytic converter is maintained at a suitable value for determining the deterioration of the converter. When the air-fuel ratio of the exhaust gas flowing into the catalytic converter fluctuates between a rich air-fuel ratio and a lean air-fuel ratio, the catalytic converter absorbs oxygen from the exhaust gas when the air-fuel ratio of the exhaust gas is rich, and releases the absorbed oxygen when the air-fuel ratio of the exhaust gas is lean. According to the present invention, the amount of oxygen released from the catalytic converter during the rich air-fuel ratio period of exhaust gas is controlled to a predetermined amount. This amount is set at the value larger than the maximum oxygen absorbing capacity of a deteriorated catalytic converter, and smaller than the maximum oxygen absorbing capacity of a normal catalyst. Therefore, the air-fuel ratio of the exhaust gas flowing out from a deteriorated catalytic converter fluctuates largely, while the air-fuel ratio of the exhaust gas flowing out from a normal catalytic converter does not fluctuate. Thus, deterioration of the catalytic converter can be determined accurately.

5 Claims, 20 Drawing Sheets

DEVICE FOR DETERMINING DETERIORATION OF A CATALYTIC CONVERTER FOR AN ENGINE

BACKGROUND OF THE INVENTION

1. Field of the Invention

The present invention relates to a device for determining deterioration of a catalytic converter for an engine. More specifically, the present invention relates to a device which controls the air-fuel ratio of the engine based on at least the output of an air-fuel ratio sensor disposed in an exhaust gas passage upstream of a catalytic converter and detects deterioration of the catalytic converter based on at least the output of an air-fuel ratio sensor disposed in the exhaust gas passage downstream of the catalytic converter.

2. Description of the Related Art

A method for determining deterioration of a catalytic converter based on the output signals of air-fuel ratio sensors disposed in an exhaust gas upstream and downstream of a catalytic converter of an engine is known. In this method, usually, deterioration of the catalytic converter is determined based on at least the output signal of the downstream air-fuel ratio sensor when the air-fuel ratio of the exhaust gas flowing into the catalytic converter is feedback controlled to a stoichiometric mixture based on at least the output of the upstream air-fuel ratio sensor.

A three-way catalytic converter usually has an $O_2$ storage capability, i.e., a capability for absorbing oxygen in the exhaust gas when the air-fuel ratio of the exhaust gas flowing into the catalytic converter is lean compared to the stoichiometric air-fuel ratio and for releasing the absorbed oxygen when the air-fuel ratio of the exhaust gas flowing into the catalytic converter is rich compared to the stoichiometric air-fuel ratio. Due to this $O_2$ storage capability, the air-fuel ratio of the exhaust gas flowing out from the catalytic converter is kept near the stoichiometric air-fuel ratio even when the air-fuel ratio of the exhaust gas flowing into the catalytic converter fluctuates between a rich air-fuel ratio and a lean air-fuel ratio in a relatively short cycle period. Therefore, if the catalytic converter has not deteriorated, the fluctuation of the air-fuel ratio of the exhaust gas upstream of the catalytic converter is smoothed by the catalytic converter and, thereby, the air-fuel ratio of the exhaust gas downstream of the catalytic converter fluctuates in a relatively small amplitude and in a relatively low frequency.

However, the $O_2$ storage capability of the catalytic converter decreases as deterioration of the catalytic converter proceeds, and the amount of oxygen absorbed and released by the catalytic converter becomes small when the catalytic converter has deteriorated. Therefore, if the catalytic converter has deteriorated, the air-fuel ratio of the exhaust gas downstream of the catalytic converter fluctuates in the manner similar to that of the air-fuel ratio in the exhaust gas upstream of the catalytic converter, i.e., when the catalytic converter has deteriorated, the amplitude of the fluctuation of the air-fuel ratio of exhaust gas downstream of the catalytic converter becomes larger, and the frequency thereof becomes higher. The conventional method utilizes this phenomena for determining the deterioration of the catalytic converter. Namely, if the air-fuel ratio of the exhaust gas downstream of the catalytic converter fluctuates in the same manner as that of the exhaust gas upstream of the catalytic converter, it is considered that the catalytic converter has deteriorated.

However, in the conventional method, an error occurs in the detection of deterioration of the catalytic converter in some cases. For example, if the period of the fluctuation of the air-fuel ratio of the exhaust gas flowing into the catalytic converter becomes long, both the period in which the air-fuel ratio of the exhaust gas stays on a rich air-fuel ratio side (hereinafter, referred to as the "rich period") and the period in which the air-fuel ratio of the exhaust gas stays on a lean air-fuel ratio side (hereinafter referred to as the "lean period") becomes long. When the rich period becomes long, the catalytic converter, even if it is not deteriorated, releases all the oxygen it absorbed in the lean period and, if the rich period continues after the catalytic converter has released all the absorbed oxygen, the air-fuel ratio of the exhaust gas downstream of the catalytic converter fluctuates to a rich air-fuel ratio side. On the contrary, if the lean period becomes long, the catalytic converter absorbs oxygen to its maximum capacity before the lean period ends and, since the catalytic converter cannot absorb oxygen in the exhaust gas after it is saturated with oxygen, the air-fuel ratio of the exhaust gas downstream of the catalytic converter fluctuates to a lean air-fuel ratio side even if the catalytic converter is not deteriorated. Therefore, when the period of the fluctuation of the air-fuel ratio of the exhaust gas upstream of the catalytic converter becomes long, the air-fuel ratio of the exhaust gas downstream of the catalytic converter fluctuates in the same manner as that of the exhaust gas upstream of the catalytic converter and, thereby, according to the conventional method, a normal catalytic converter may be incorrectly determined as being deteriorated.

Japanese Unexamined Patent Publication (Kokai) No. 5-10182 discloses a detecting device for deterioration of the catalytic converter which prevents the above-mentioned problem by forcibly adjusting the period of fluctuation of the air-fuel ratio in such a manner that the period of the fluctuation of the air-fuel ratio of the engine agrees with a constant target value when determining the deterioration of the catalytic converter.

Since the $O_2$ storage capability of the catalytic converter decreases with the progress of deterioration of the catalytic converter, the length of the rich period in which the air-fuel ratio of the downstream exhaust gas starts to fluctuate to the rich air-fuel ratio side becomes shorter as the degree of deterioration of the catalytic converter increases. The device in the '182 publication adjusts the period of the fluctuation of the air-fuel ratio of the upstream exhaust gas so that the rich period of the air-fuel ratio of the upstream exhaust gas is sufficiently long for a deteriorated catalytic converter (i.e., sufficiently long to ensure that the air-fuel ratio of the downstream exhaust gas fluctuates if the catalytic converter has deteriorated to a certain degree) and simultaneously, sufficiently short for a normal catalytic converter (i.e., sufficiently short to ensure that the air-fuel ratio of the downstream exhaust gas does not fluctuate if the catalytic converter is not deteriorated). The device in the '182 publication determines whether the catalytic converter has deteriorated based on the output signal response curve of the downstream air-fuel ratio sensor when the period of the fluctuation is controlled in the above explained manner. Thus, the device in the '182 publication eliminates an error in determining the deterioration of the catalytic converter caused by the increase in the length of the rich period.

However, even if the rich time of the exhaust gas upstream of the catalytic converter is controlled in the manner explained above, an error may be involved in the determination of deterioration by the device in the '182 publication. The method used by the device in the '182 publication assumes that the amount of oxygen released from the catalytic converter is proportional to the length of the rich period of the exhaust gas flowing into the catalytic converter. In other words, the method used in the '182 publication assumes that the amount of oxygen released from the catalytic converter is always the same if the length of the rich period is the same. However, in the actual operation, the amount of oxygen released from the catalytic converter varies largely in accordance with the conditions of the exhaust gas flowing into the catalytic converter. For example, if the degree of richness of the exhaust gas is high (i.e., if the air-fuel ratio of the exhaust gas flowing into the catalytic converter is low), the amount of oxygen released from the catalytic converter becomes large compared to that when the degree of richness of the exhaust gas is low (i.e., when the air-fuel ratio of the exhaust gas is high) even if the length of the rich period is the same. Further, even if the degree of richness is the same, the amount of oxygen released from the catalytic converter in a unit time becomes larger as the flow rate of the exhaust gas increases.

Therefore, it is not possible to maintain the amount of the oxygen released from the catalytic converter at a desired value by merely controlling the length of the rich period. Thus, an error may occur in the determination of deterioration of the catalytic converter by the device in '182 publication. For example, when the degree of richness of the exhaust gas flowing into the catalytic converter is high, and the flow rate thereof is large, a normal catalytic converter as well as deteriorated catalytic converter releases all the absorbed oxygen within the rich period even if the length of the rich period is kept constant, and the air-fuel ratio of the exhaust gas flowing out from the normal catalytic converter fluctuates in the same manner as that of the upstream exhaust gas. If this occurs, the device in the '182 publication incorrectly determines a normal catalytic converter as being deteriorated. On the contrary, when the degree of richness of the exhaust gas flowing into the catalytic converter is low and the flow rate thereof is small, since the amount of oxygen released from the catalytic converter becomes small, even a deteriorated catalytic converter does not release all the amount of the oxygen within the rich period. In this case, since the air-fuel ratio of the downstream exhaust gas does not fluctuate largely even if the catalytic converter has deteriorated, the device in '182 publication incorrectly determines a deteriorated catalytic converter as being normal.

SUMMARY OF THE INVENTION

In view of the problems in the related art as set forth above, the object of the present invention is to provide a device for determining deterioration of the catalytic converter which is capable of eliminating an error in the determination of deterioration caused by the variation of the conditions of the exhaust gas flowing into the catalytic converter.

This object is achieved by a device for determining deterioration of a catalytic converter, in which the device comprises an upstream air-fuel ratio sensor disposed in an exhaust gas passage of an engine upstream of a catalytic converter for detecting an air-fuel ratio of an exhaust gas upstream of the catalytic converter, a downstream air-fuel ratio sensor disposed in the exhaust gas passage of the engine downstream of the catalytic converter for detecting the air-fuel ratio of the exhaust gas downstream of the catalytic converter, air-fuel ratio feedback control means for controlling the air-fuel ratio of the exhaust gas flowing into the catalytic converter based on at least an output signal of the upstream air-fuel ratio sensor in such a manner that the air-fuel ratio of the exhaust gas upstream of the catalytic converter changes between a rich air-fuel ratio and a lean air-fuel ratio compared to a stoichiometric air-fuel ratio alternately, oxygen amount calculating means for calculating the amount of oxygen released from the catalytic converter based on at least the air-fuel ratio of the exhaust gas flowing into the catalytic converter when the air-fuel ratio of exhaust gas flowing into the catalytic converter is rich, oxygen amount control means for controlling the length of the time period in which the air-fuel ratio of the exhaust gas flowing into the catalytic converter becomes a rich air-fuel ratio in such a manner that the amount of oxygen released from the catalytic converter becomes a predetermined value, and determining means for determining a degree of deterioration of the catalytic converter based on at least an output of the downstream air-fuel ratio sensor when the amount of the oxygen released from the catalytic converter is maintained at the predetermined value.

According to the present invention, the length of the rich period is controlled by the oxygen amount control means based on the amount of oxygen released from the catalytic converter in such a manner that the amount of oxygen released from the catalytic converter becomes a predetermined constant value regardless of the degree of richness of the upstream exhaust gas or the flow rate thereof. For example, the oxygen amount control means shortens the length of the rich period if the degree of richness and the flow rate of the exhaust gas flowing into the catalytic converter is high, and extends the rich period if the degree of richness and the flow rate of the exhaust gas is low. Therefore, if the maximum amount of the oxygen absorbed by the catalytic converter becomes less than the predetermined amount due to deterioration, the catalytic converter always releases all the absorbed oxygen within the rich period and the air-fuel ratio of the downstream exhaust gas fluctuates in the same manner as that of the upstream exhaust gas. However, if the catalytic converter is normal, i.e., if the maximum amount of oxygen absorbed by the catalytic converter is larger than the predetermined amount, the catalytic converter releases only a part of absorbed oxygen within the rich period and the fluctuation of the air-fuel ratio of the downstream exhaust gas does not increase. Therefore, according to the present invention, deterioration of the catalytic converter is determined accurately regardless of the changes in the conditions of the exhaust gas flowing into the catalytic converter.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
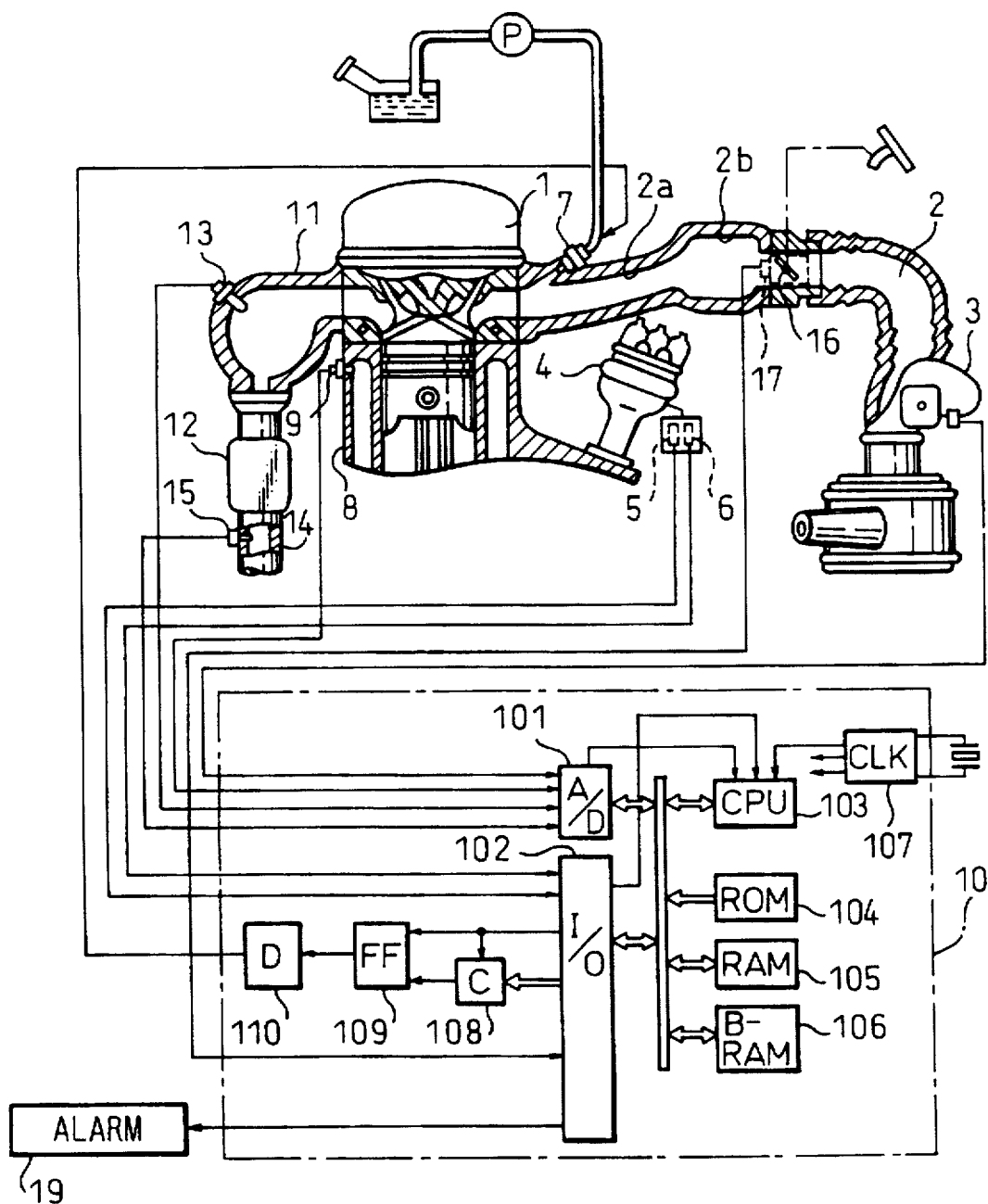
FIG. 1 schematically illustrates an embodiment of the present invention when applied to an automobile engine.

FIG. 1 schematically illustrates an embodiment of the device for determining the deterioration of the catalytic converter when the present invention is applied to an automobile engine.

In FIG. 1, reference numeral 1 represents an internal combustion engine for an automobile. An air intake passage 2 of the engine 1 is provided with a potentiometer-type airflow meter 3 for detecting the amount of air drawn into the engine 1. The airflow meter 3 generates an analog voltage signal which is proportional to the amount of air flowing therethrough. The signal from the airflow meter 3 is transmitted to a multiplexer-incorporating analog-to-digital (A/D) converter 101 of a control circuit 10.

Crank angle sensors 5 and 6, for detecting the angle of the crankshaft (not shown) of the engine 1, are disposed at a distributor 4 of the engine 1.

In this embodiment, the crank angle sensor 5 generates a pulse signal at every 720° crank angle and the crank angle sensor 6 generates a pulse signal at every 30° crank angle. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant, and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 has an $O_2$ storage capacity and is capable of removing three pollutants in the exhaust gas, i.e., CO, HC and $NO_x$, simultaneously.

An upstream $O_2$ sensor 13 is provided at the exhaust manifold 11, i.e., upstream of the catalytic converter 12. A downstream $O_2$ sensor 15 is disposed at an exhaust pipe 14 downstream of the catalytic converter 12. The upstream $O_2$ sensor 13 and the downstream $O_2$ sensor 15 generate output signals corresponding to the concentration of the oxygen component in the exhaust gas. More specifically, the $O_2$ sensors 13 and 15 generate output voltage signals that change in accordance with whether the air-fuel ratio of the exhaust gas is rich or lean compared to the stoichiometric air-fuel ratio. In this specification, the term "air-fuel ratio of the exhaust gas" means the ratio of the amounts of air and fuel supplied to the engine and exhaust gas passage upstream of a considered point. Therefore, if no air and fuel are supplied to the exhaust gas passage, the air-fuel ratio of the exhaust gas agrees with an operating air-fuel ratio of the engine (i.e., air-fuel ratio of the air-fuel mixture supplied to the engine). The signals output by the $O_2$ sensors 13 and 15 are transmitted to the A/D converter 101 of the control circuit 10.

The control circuit 10, which may consist of a microcomputer, further comprises a central processing unit (CPU) 103, a read-only-memory (ROM) 104 for storing a main routine and interrupt routines such as a fuel injection routine and an ignition timing routine, and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the main switch of the engine (not shown) is turned off.

A throttle valve 16, operated by the vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 19 designates an alarm that is activated when the catalytic converter 12 is determined as being deteriorated.

A down counter 108, a flip-flop 109, and a drive circuit 110 are provided in the control circuit 10 for controlling the fuel injection valve 7.

When a fuel injection amount TAU is calculated in a fuel injection amount calculation routine explained later, the amount TAU is preset in the down counter 108, and simultaneously, the flip-flop 109 is set, and as a result, the drive circuit 110 initiates the activation of the fuel injection valve 7. The down counter 108 counts up the clock signal from the clock generator 107, and finally, a logic 1 signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are fetched by an A/D conversion routine(s) executed at predetermined intervals, and then stored in the RAM 105; i.e., the data Q and THW in the RAM 105 are updated at predetermined intervals. The engine speed Ne is calculated by an interruption routine executed at every 30° crank angle, i.e., at every pulse signal of the crank angle sensor 6, and is stored in the RAM 105.

In this embodiment, the air-fuel ratio of the engine 1 is feedback controlled based on the output signals of the $O_2$ sensors 13 and 15 in such a manner that the amount of the oxygen released from the catalytic converter 12 becomes a predetermined target value when the detection of deterioration of catalytic converter is performed. Therefore, the air-fuel ratio feedback control, which is a prerequisite for the determining operation for deterioration of the catalytic converter, is first explained.

Figure 2:
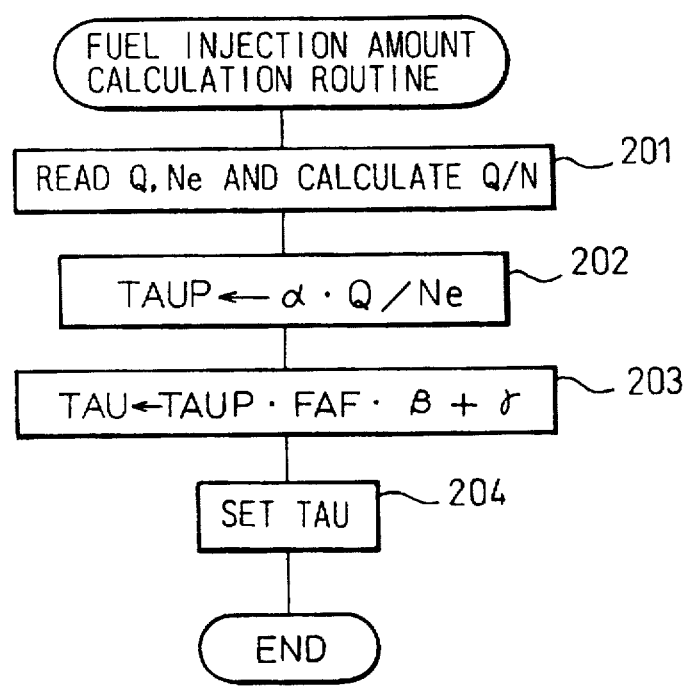
FIG. 2 is a flowchart illustrating a calculation of the amount of the fuel injection in the embodiment in FIG. 1.

FIG. 2 shows a flowchart of a fuel injection amount calculation routine of the present embodiment. The routine in FIG. 2 is processed by the control circuit 10 at predetermined crank rotation angles (for example, every 360° rotation of the crankshaft). In the routine in FIG. 2, the fuel injection amount TAU, i.e., the length of the period in which the fuel injection valve 7 injects fuel is calculated in accordance with the amount of intake air per one revolution of the engine Q/Ne and an air-fuel ratio correction factor FAF which is explained later. Namely, in the routine in FIG. 2, the intake air amount data Q and the engine speed data Ne are read from the predetermined storage area of the RAM 105, and the value Q/Ne is calculated (step 201). Then a basic fuel injection amount TAUP is calculated in accordance with the value Q/Ne by TAUP=α×Q/Ne (at step 202). The basic fuel injection amount TAUP is a fuel injection amount required to make the air-fuel ratio of the air-fuel mixture supplied to the combustion chamber of the engine 1 stoichiometric, and α is a constant.

The actual fuel injection amount TAU is calculated from the basic fuel injection TAUP and the air-fuel ratio correction factor FAF by the following formula (step 203).

$$TAU=TAUP \times FAF \times \beta + \gamma$$

β and γ are constants determined in accordance with the operating conditions of the engine. When the fuel injection amount TAU is calculated by the above explained steps, the value TAU is preset at the down counter 108 at step 204 and, thereby, the amount of fuel corresponding to the value TAU is injected from the fuel injection valve 7.

Figure 3:
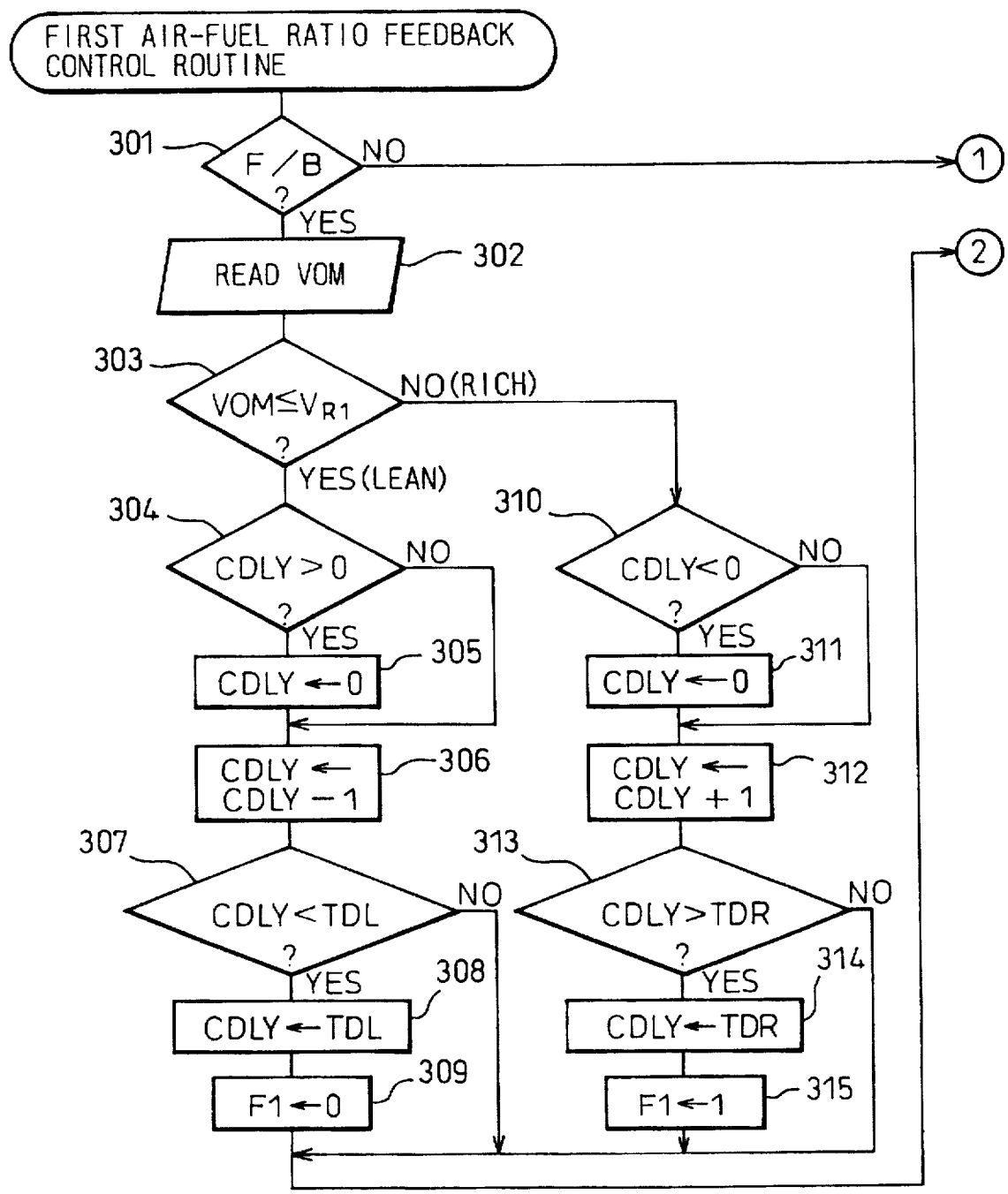
FIGS. 3 and 4 are a flowchart illustrating a first air-fuel ratio feedback control of the embodiment in FIG. 1.
Figure 4:
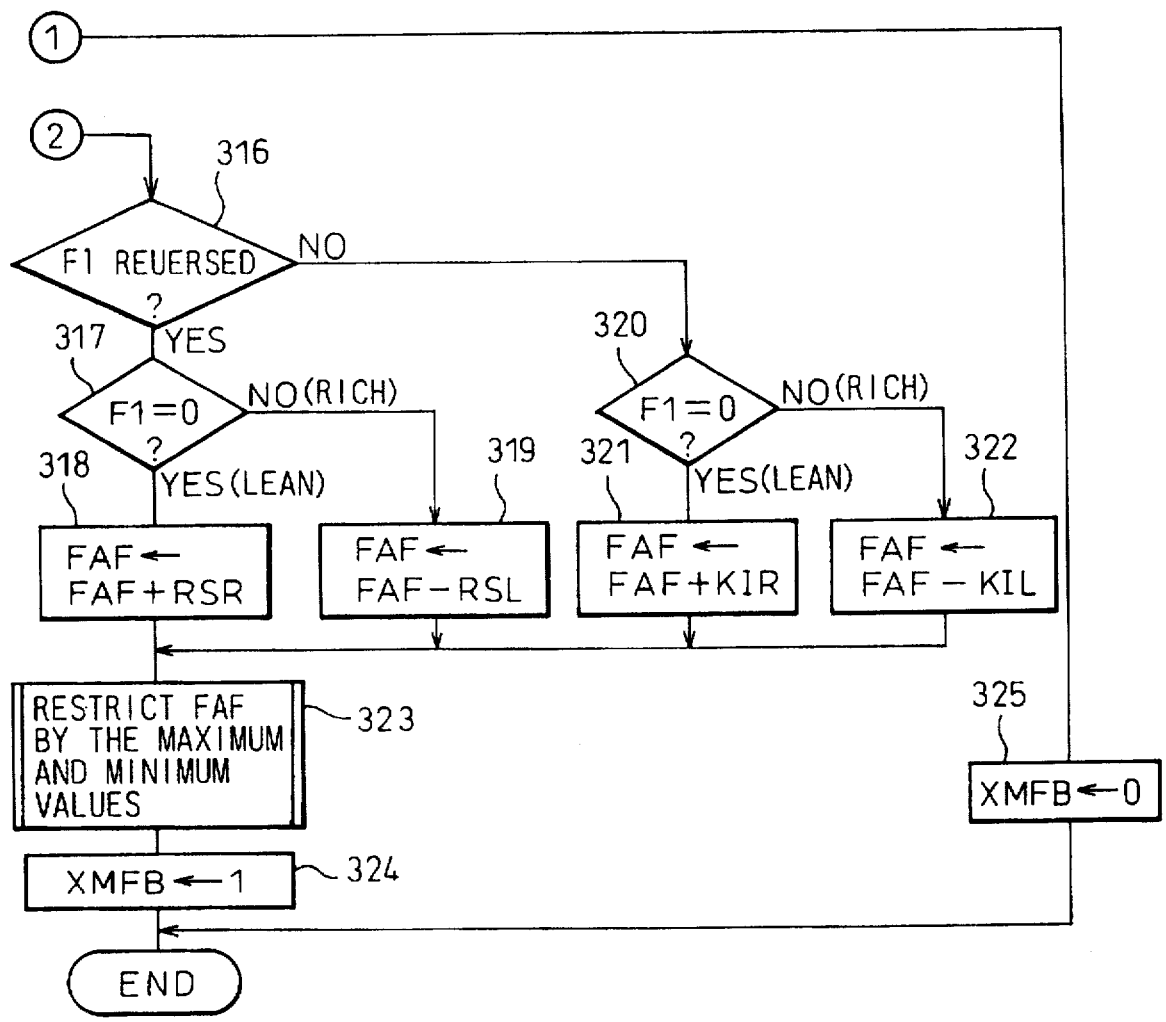

FIGS. 3 and 4 illustrate a first air-fuel ratio feedback control routine in which the value of the air-fuel ratio correction factor FAF is determined in accordance with the output signal of the upstream $O_2$ sensor 13. The routine in FIGS. 3 and 4 is processed by the control circuit 10 at a predetermined intervals (for example, every 4 ms).

In this routine, the value of the air-fuel ratio correction factor FAF is decreased when an output voltage signal VOM of the $O_2$ sensor 13 is higher than a reference voltage $V_{R1}$ (i.e., VOM>$V_{R1}$), and is increased when the output VOM is lower than or equal to the reference voltage $V_{R1}$ (i.e., VOM≤$V_{R1}$). The reference voltage $V_{R1}$ is an output voltage of the $O_2$ sensor 13 which corresponds to the stoichiometric air-fuel ratio. The $O_2$ sensor 13 outputs voltage signal of, for example, 0.9 V when the air-fuel ratio of the exhaust gas is on a rich side compared to the stoichiometric air-fuel ratio, and of 0.1 V, for example, when the air-fuel ratio of the exhaust gas is on a lean side compared to the stoichiometric air-fuel ratio. The reference voltage $V_{R1}$ of the $O_2$ sensor is set at 0.45 V, for example, in this embodiment. By adjusting the value of FAF in accordance with the air-fuel ratio of the exhaust gas, the air-fuel ratio of the engine is maintained near the stoichiometric air-fuel ratio even if the characteristics of the elements in the fuel supply system such as the airflow meter 3 and the fuel injection valve 7 deviate from the design characteristics by a certain amount.

The flowchart in FIGS. 3 and 4 is explained in brief. When the routine starts in FIG. 3, at step 301, it is determined whether the conditions for performing the air-fuel ratio feedback control are satisfied. The conditions determined at step 301 are, for example, whether the $O_2$ sensor 13 is activated, whether the engine 1 is warmed up and whether a predetermined time has elapsed since a fuel cut operation (in which the fuel injection is interrupted) such as in an engine brake operation is terminated. If these conditions are satisfied at step 301, the routine executes steps 302 and other steps to calculate the value of FAF. If any of the conditions are not satisfied, the routine terminates after setting the value of a flag XMFB at 0 at step 325 in FIG. 4. XMFB is a flag which represents whether the first air-fuel ratio control is being performed, and XMFB =0 means that the first air-fuel ratio control is interrupted.

Steps 302 through 315 in FIG. 3 are steps for determining the air-fuel ratio of the exhaust gas. F1 in steps 309 and 315 is a flag representing whether the air-fuel ratio of the exhaust gas is on a rich side (F1=1) or on a lean side (F1=0) compared to the stoichiometric air-fuel ratio. The value of F1 is switched (reversed) from 0 to 1 (a lean condition to a rich condition) when the $O_2$ sensor 13 Continuously outputs a rich signal (i.e., VOM>$V_{R1}$) for more than a predetermined time period (TDR) (steps 303 and 304 through 309). Similarly, the value of F1 is switched (reversed) from 1 to 0 (a rich condition to a lean condition) when the $O_2$ sensor 13 continuously outputs a lean signal (VOM≤$V_{R1}$) for more than a predetermined time period (TDL) (steps 303 and 310 through 315). CDLY in the flowchart is a counter for determining the timing for reversing the value of the flag F1. In this embodiment, TDL in step 307 is a negative constant and TDR in step 313 is a positive constant.

At steps 316 through 324 in FIG. 4, the value of FAF is adjusted in accordance with the value of the flag F1 set by the steps explained above. At step 316, it is determined whether the air-fuel ratio of the exhaust gas is reversed (i.e., changed from a rich air-fuel ratio to a lean air-fuel ratio, or vice versa) since the routine was last executed, by determining whether the value of F1 changed from 1 to 0 or 0 to 1). If the value of F1 changed from 1 to 0 (a rich condition to a lean condition) since the routine was last executed (steps 316 and 317), the value of FAF is increased step-wise by a relatively large amount RSR (step 318), and if the value of F1 changed from 0 to 1 (a lean condition to a rich condition) since the routine was last executed (steps 316 and 317), the value of FAF is decreased step-wise by a relatively large amount RSL (step 319). If the value of F1 did not change since the routine was last executed, and if the value of F1 is 0, the value of FAF is increased by a relatively small amount KIR every time the routine is executed, as long as the value of F1 is 0 (steps 316, 320 and 321). Similarly, if the value of F1 did not change, and if the value of F1 is 1, the value of FAF is decreased by a relatively small amount KIL every time the routine is executed (steps 316, 320 and 322). Namely, when the value of F1 did not reverse, the value of FAF is gradually increased or decreased in accordance with whether the air-fuel ratio of exhaust gas (F1) is rich or lean. Further, the value of FAF is restricted by the maximum value (for example, 1.2) and the minimum value (for example, 0.8) to keep the value of FAF within the range determined by the maximum and the minimum values (step 323). Then, the routine terminates this time, after setting the value of the flag XMFB at 1 at step 324.

Figure 6:
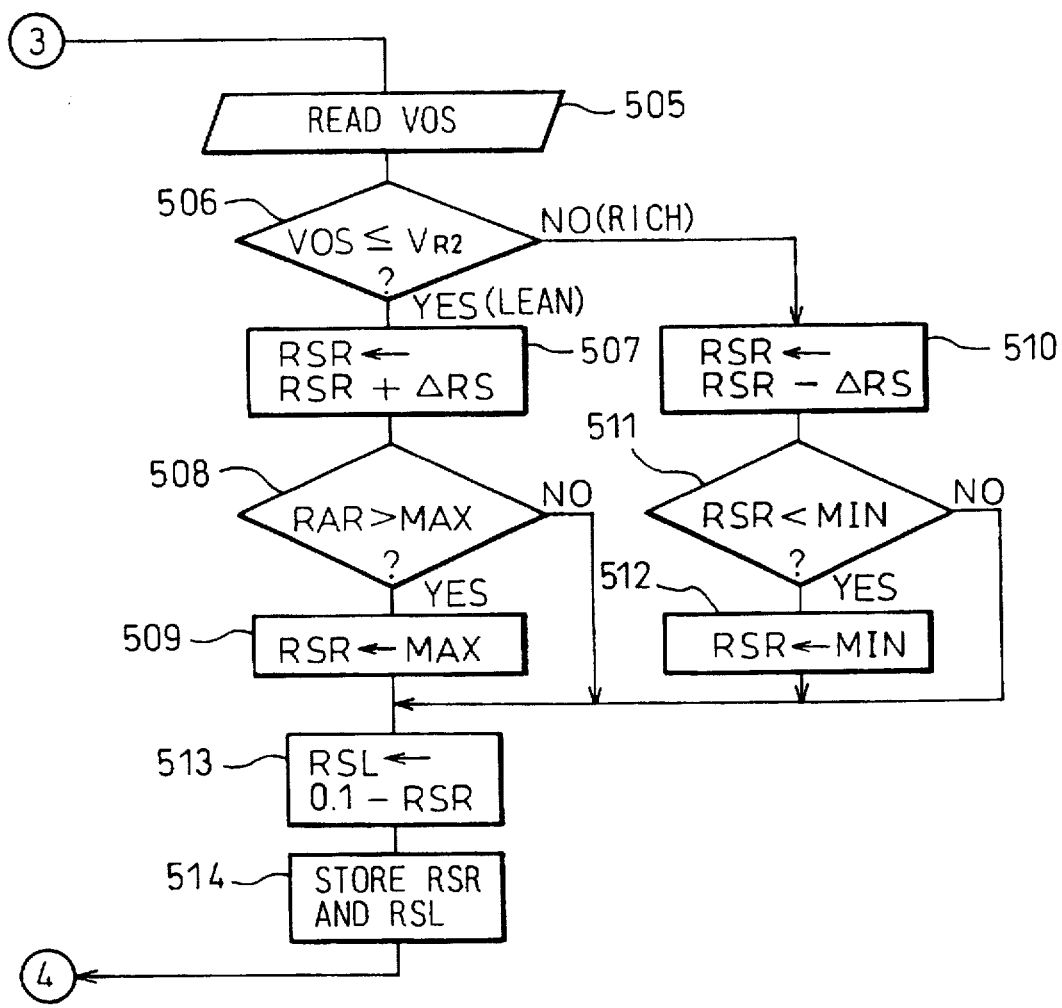
Figure 7A:
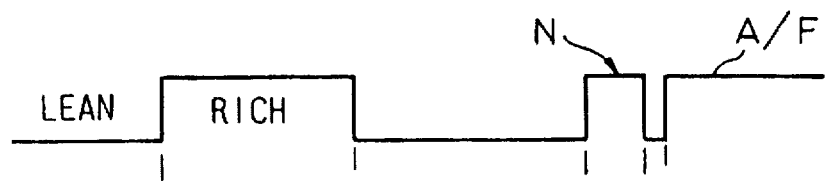
FIG. 7 is a timing diagram explaining the air-fuel ratio control in FIGS. 3 through 6.
Figure 7B:
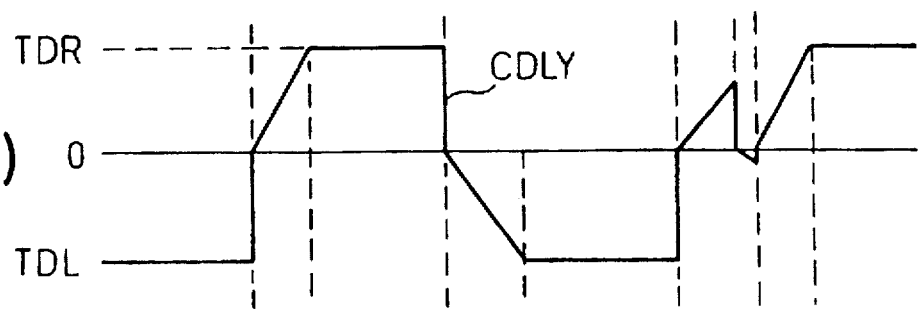
Figure 7C:
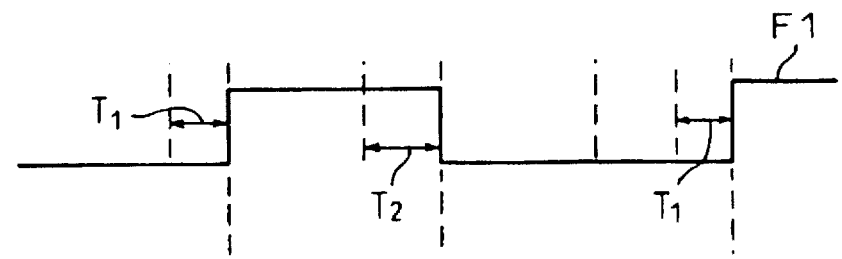
Figure 7D:
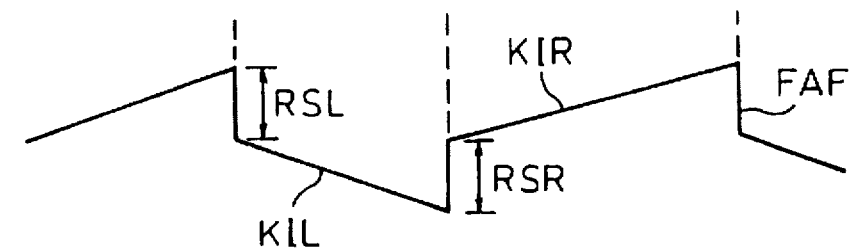

Next, a second air-fuel ratio control in which the values of RSR and RSL are determined in accordance with the output VOS of the downstream $O_2$ sensor 15 is explained. FIGS. 7 and 6 are a flowchart illustrating the second air-fuel ratio control routine of the present embodiment. In this routine, the values of second air-fuel ratio correction factors RSR and RSL are calculated in accordance with the output of the downstream $O_2$ sensor 29. This routine is normally processed at intervals longer than that of the first air-fuel ratio control routine control (for example, every 500 ms).

In this routine, the output voltage VOS of the downstream $O_2$ sensor 15 is compared with a reference voltage $V_{R2}$, and the amounts RSR and RSL used in the first air-fuel ratio control routine are changed in accordance with whether VOS is larger or smaller than $V_{R2}$. The reference voltage $V_{R2}$ is an output voltage of the downstream $O_2$ sensor 15 which corresponds to the stoichiometric air-fuel ratio. When $VOS > V_{R2}$, i.e., when the air-fuel ratio of the exhaust gas downstream of the catalytic converter is rich compared to the stoichiometric air-fuel ratio, the amount RSR is decreased, and at the same time, the amount RSL is increased. Similarly, when $VOS \leq V_{R2}$, i.e., when the air-fuel ratio of the exhaust gas downstream of the catalytic converter is lean compared to the stoichiometric air-fuel ratio, the amount RSR is increased and the amount RSL is decreased simultaneously. When the amount RSR becomes larger, the value of FAF also becomes larger and, thereby, the fuel injection amount determined by the routine in FIG. 2 becomes larger. On the contrary, when the amount RSL becomes larger, the value of FAF becomes smaller, and the fuel injection amount becomes smaller. Therefore, even when the characteristics of the elements in the fuel system changes, the deviation from the design characteristics is corrected by the change in the values of RSR and PSL and, thereby the air-fuel ratio of the engine is maintained at the stoichiometric air-fuel ratio.

Figure 5:
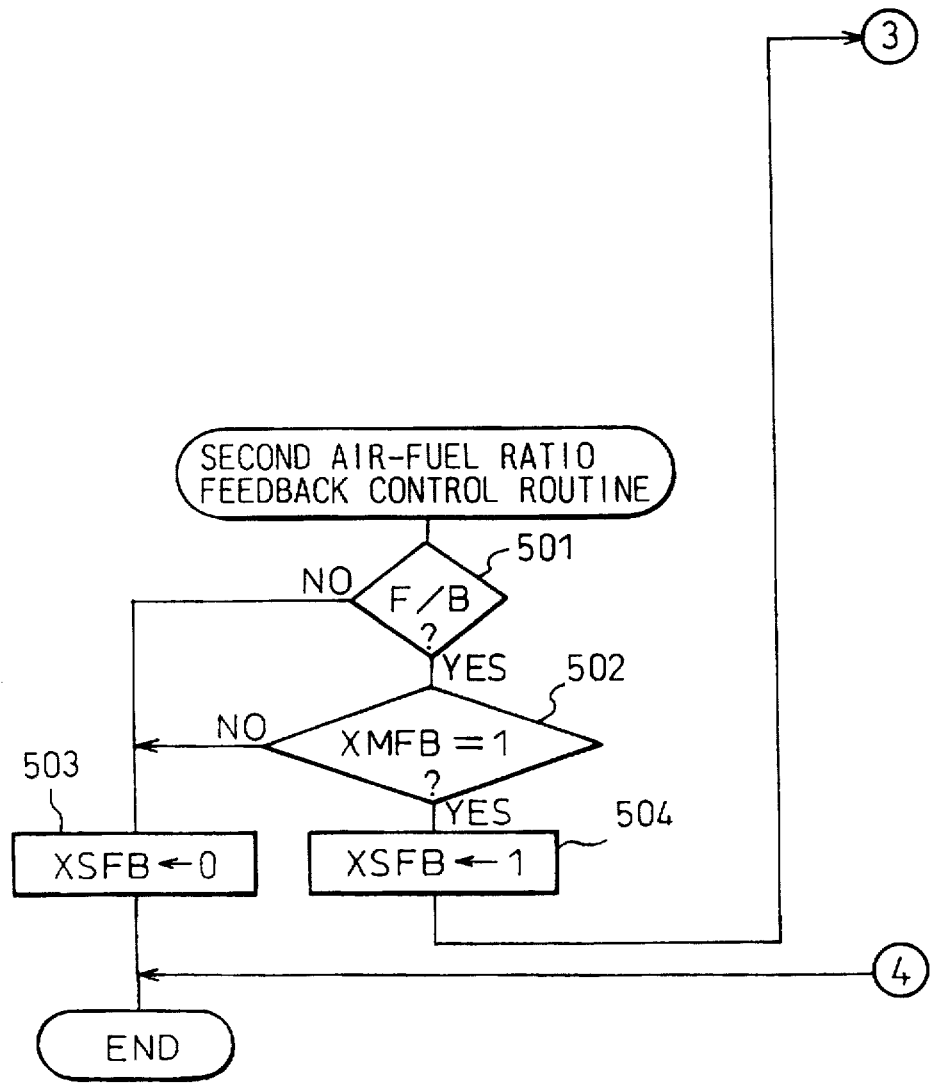
FIGS. 5 and 6 are a flowchart illustrating a second air-fuel ratio feedback control in the embodiment in FIG. 1.

The flowchart of the second air-fuel ratio control routine FIGS. 5 and 6 is explained hereinafter in brief.

In FIG. 5, at steps 501 and 502, it is determined whether the conditions for performing the second air-fuel ratio control is satisfied. The conditions determined at step 501 are similar to the conditions determined at step 301 in FIG. 3. However, in this routine, it is determined at step 502, whether the first air-fuel ratio control routine is being carried out, based on the value of the flag XMFB. If all the conditions in step 501 are satisfied, and the first air-fuel ratio control routine is being carried out, a value of the flag XFSB is set at 1 at step 504, and the values of RSR and RSL are adjusted at the steps 505 through 514 in FIG. 6. If any of conditions in step 501 are not satisfied, or if the first air-fuel ratio control routine is interrupted, the value of the flag XFSB is set at 0 at step 503, and the routine terminates immediately. XFSB is a flag representing whether the second air-fuel ratio control is being carried out, and XFSB=1 means that the second air-fuel ratio control is being carried out, and XFSB=0 means that the second air-fuel ratio control is interrupted.

At steps 505 through 514, the value of RSR is increased or decreased in accordance with whether the air-fuel ratio of the exhaust gas detected by the downstream $O_2$ sensor 15 is rich or lean. Namely, at step 505, the output VOS of the downstream $O_2$ sensor 15 is read through the A/D converter.

At step 506, VOS is compared with the reference voltage $V_{R2}$, to determine whether the air-fuel ratio of the exhaust gas downstream of the catalytic converter is rich or lean. If $VOS \leq V_{R2}$ (lean), the value of RSR is increased by an amount ARS at step 507, and after that, the value of RSR is restricted by the maximum value MAX at steps 508 and 509. Similarly, the value of RSR is decreased by the amount ARS if $VOS > V_{R2}$ (rich) at step 510, and after that, the value of RSR is restricted by the minimum value MIN at steps 511 and 512 (for example, MIN=0.01 in this embodiment). The value of RSL is, then, calculated at step 513 by RSR=0.1−RSR. Namely, the sum of the values of RSR and RSL is always maintained at a constant value 0.1. Therefore, in the second air-fuel ratio control, when the downstream $O_2$ sensor outputs a rich air-fuel ratio signal (i.e., $VOS > V_{R2}$), RSR is decreased and RSL is increased simultaneously, and when the downstream $O_2$ sensor outputs a lean air-fuel ratio signal (i.e., $VOS \leq V_{R2}$), RSR is increased and RSL is decreased simultaneously.

FIG. 7 shows changes in the values of the counter CDLY (the curve (b) in FIG. 7), the flag F1 (the curve (c) in FIG. 7) and FAF (the curve (d) in FIG. 7) in accordance with the change in the air-fuel ratio (A/F) detected by the upstream $O_2$ sensor 13 (the curve (a) in FIG. 7) when the air-fuel ratio is controlled by the routines in FIGS. 3, 4 and 5, 6. As shown by the curve (a) in FIG. 7, the value of the flag F1 does not immediately change from 0 to 1 even when the air-fuel ratio A/F detected by the upstream $O_2$ sensor 13 changes from a lean air-fuel ratio to a rich air-fuel ratio. The value of F1 changed from 0 to 1 only when the value of the counter CDLY increases from 0 to TDR (TDR>0), i.e., the value of F1 changes from 0 to 1 when a period corresponding to the value of TDR (shown by $T_1$ in FIG. 7) has elapsed after A/F changed from a lean air-fuel ratio to a rich air-fuel ratio. Similarly, the value of F1 changes from 1 to 0 when a period (shown by $T_2$ in FIG. 7) corresponding to the value of TDL (TDL<0) has elapsed after A/F changed from a rich air-fuel ratio to a lean air-fuel ratio. Consequently, the value of F1 does not change even if A/F changes for a short time (shown by N in FIG. 7) due to, for example, noise in the output signal of the upstream $O_2$ sensor and, thereby, the stability of the air-fuel ratio control in FIGS. 3 through 6 are increased.

As a result of the first and the second air-fuel ratio feedback control, the air-fuel ratio correction factor FAF fluctuates regularly around a center value 1.0, and the operating air-fuel ratio of the engine alternates between a rich air-fuel ratio and a lean air-fuel ratio regularly. Further, as seen from the curve (d) in FIG. 7, if the value of RSR is increased and the value of RSL is decreased simultaneously by the second air-fuel ratio control in FIGS. 5 and 6, the value of FAF fluctuates largely to a rich air-fuel ratio side than to a lean air-fuel ratio side and, thereby, the air-fuel ratio of the engine, as a whole, shifts to a rich air-fuel ratio side. Similarly, when the value of RSR is decreased (the value of RSL is increased) by the second air-fuel ratio control, the air-fuel ratio of the engine, as a whole, shifts to a lean air-fuel ratio side. Therefore, when the values of RSR and RSL are changed by the second air-fuel ratio control, the air-fuel ratio of the exhaust gas flowing into the catalytic converter shifts to a rich air-fuel ratio side or lean air-fuel ratio side. Though the factors RSR and RSL are changed by the second air-fuel ratio control in FIGS. 5 and 6 in this embodiment, other factors (such as KIR and KIL, TDR and TDL, or the reference voltage $V_{R1}$) may be changed in accordance with the output VOS in order to control the air-fuel ratio of the engine.

Next, the principle of the detection of deterioration of the catalytic converter in this embodiment is explained.

In this embodiment, deterioration of the catalytic converter is detected by determining the deterioration of the $O_2$ storage capability of the catalytic converter. As explained before, the catalytic converter performs an $O_2$ storage operation which absorbs oxygen in the exhaust gas when the air-fuel ratio of the exhaust gas flowing into the catalytic converter is lean, and releases the absorbed oxygen when the air-fuel ratio of the exhaust gas flowing into the catalytic converter is rich. Due to this $O_2$ storage operation, the fluctuation of the air-fuel ratio of the exhaust gas flowing out from the catalytic converter becomes small even when the air-fuel ratio of the exhaust gas flowing into the catalytic converter fluctuates between a rich air-fuel ratio and a lean air-fuel ratio regularly as shown by the curve (a) in FIG. 7. However, as deterioration of the catalytic converter proceeds, the $O_2$ storage capability of the catalytic converter becomes low, and the maximum amount of oxygen held in the catalytic converter decreases. Therefore, when the catalytic converter has deteriorated, the catalytic converter releases all the oxygen held therein within the period in which the air-fuel ratio of the exhaust gas is on a rich air-fuel ratio side, and thereafter, since no oxygen is released from the catalytic converter, the air-fuel ratio of the exhaust gas flowing out from the catalytic converter becomes the same as the air-fuel ratio of the exhaust gas flowing into the catalytic converter. Namely, the air-fuel ratio of the exhaust gas downstream of the catalytic converter fluctuates in the same manner as that of the exhaust gas upstream of the catalytic converter.

Figure 8A:
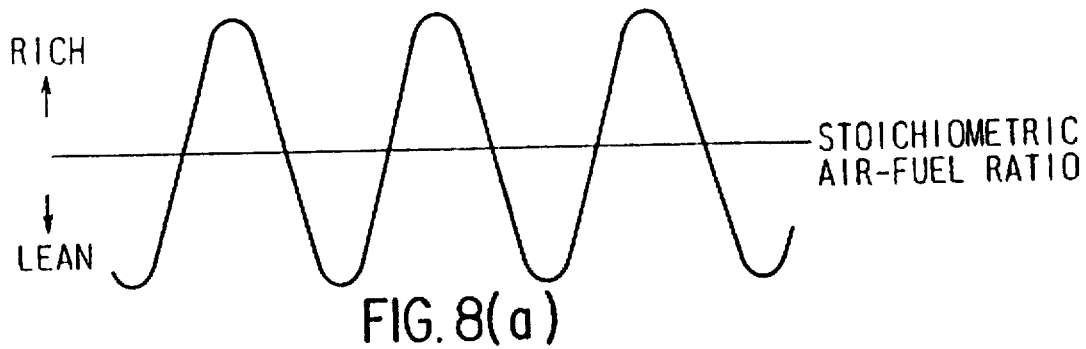
FIG. 8 schematically illustrates a change in the fluctuation of the air-fuel ratio of the exhaust gases upstream and downstream of the catalytic converter according to deterioration of the catalytic converter.
Figure 8B:
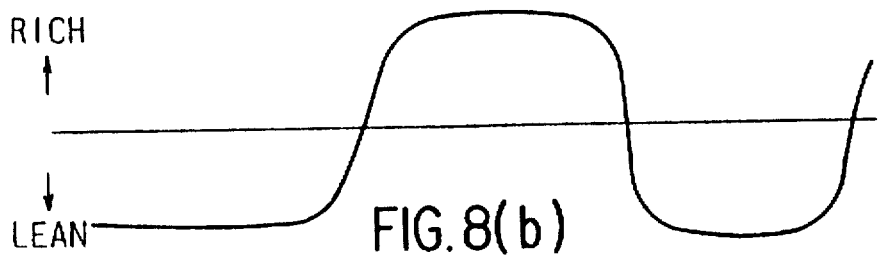
Figure 8C:
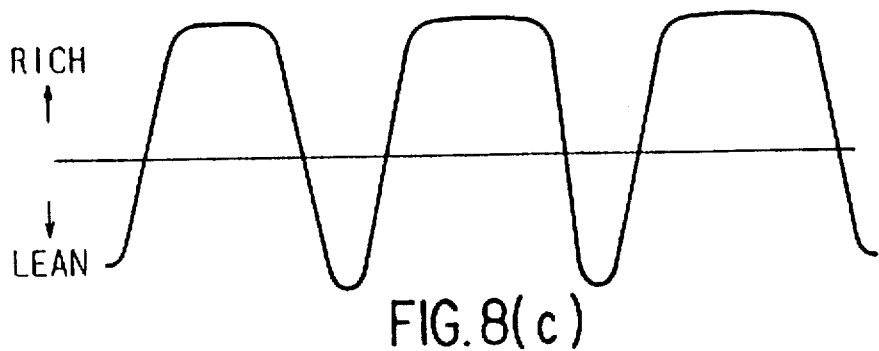
Figure 9A:
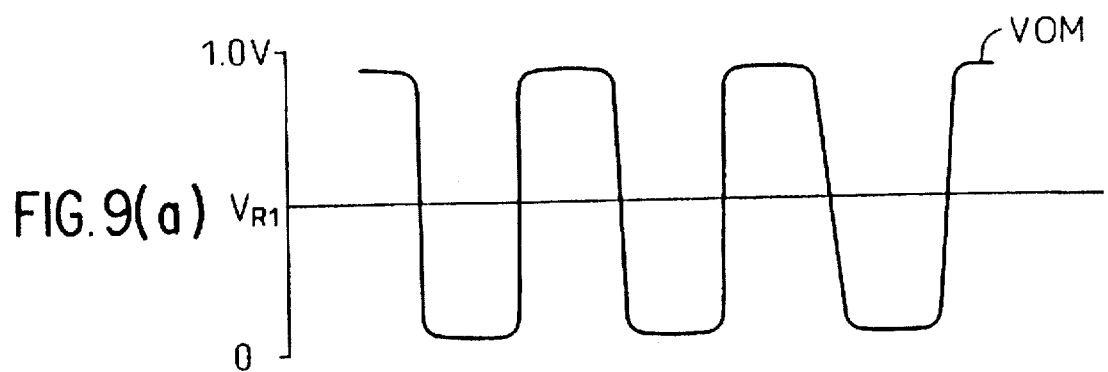
FIG. 9 shows output signal response curves of the upstream and downstream $O_2$ sensors corresponding to the fluctuations of the air-fuel ratio of the exhaust gases in FIG. 8.
Figure 9B:
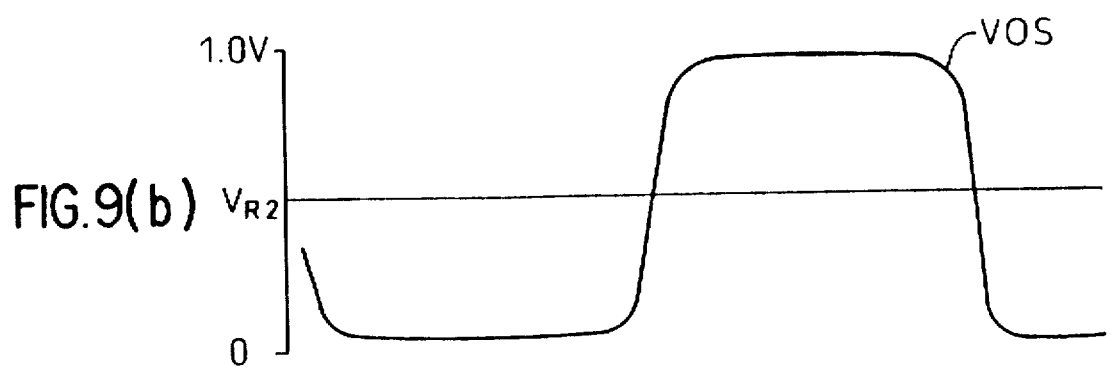
Figure 9C:
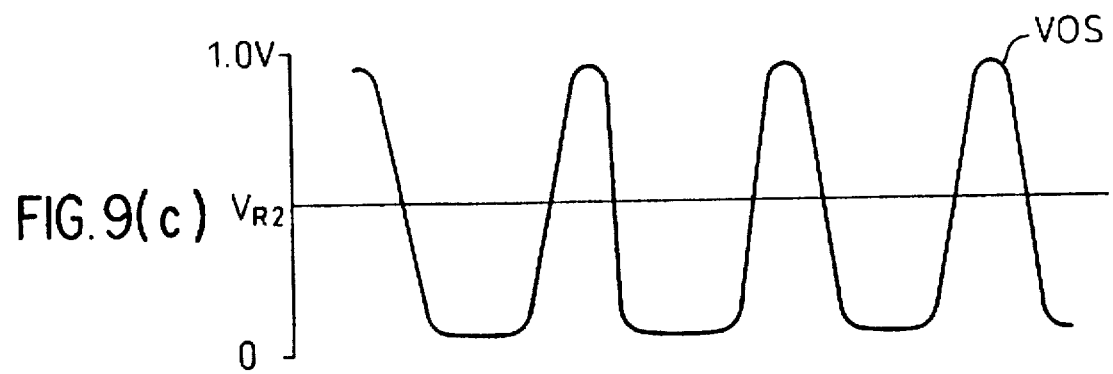

FIG. 8 schematically shows changes in the fluctuation of the air-fuel ratio of the exhaust gas downstream of the catalytic converter due to deterioration of the catalytic converter. The curve (a) in FIG. 8 shows the fluctuation of the air-fuel ratio of the exhaust gas upstream of the catalytic converter (the air-fuel ratio of the exhaust gas upstream of the catalytic converter is hereinafter referred to as "the upstream air-fuel ratio"). The curve (b) in FIG. 8 shows fluctuation of the air-fuel ratio of the exhaust gas downstream of the catalytic converter when the catalytic converter has not deteriorated (the air-fuel ratio of the exhaust gas downstream of the catalytic converter is hereinafter referred to as "the downstream air-fuel ratio"). As indicated by the curve (b) in FIG. 8, if the catalytic converter has not deteriorated, the amplitude of the fluctuation of the downstream air-fuel ratio becomes small due to the $O_2$ storage operation of the catalytic converter, and the downstream air-fuel ratio fluctuates in a long cycle period due to the second air-fuel ratio feedback control. On the contrary, if the catalytic converter has deteriorated, the downstream air-fuel ratio fluctuates in accordance with the fluctuation of the upstream air-fuel ratio due to deterioration of the $O_2$ storage capability as shown by the curve (c) in FIG. 8, i.e., the amplitude and the cycle period of the fluctuation of the downstream air-fuel ratio approaches to those of the upstream air-fuel ratio. The curves (a), (b) and (c) in FIG. 9 show the output signal response curves of the $O_2$ sensors corresponding to the fluctuations of the air-fuel ratio shown in FIG. 8. The curve (a) in FIG. 9 shows the response curve of the output signal VOM of the upstream $O_2$ sensor 13 which corresponds to the curve (a) in FIG. 8, and the curves (b) and (c) in FIG. 9 show the response curves of the output signal VOS of the downstream $O_2$ sensor 15 which correspond to the curve (b) and (c) in FIG. 8, respectively. As shown by the curve (b) in FIG. 9, when the catalytic converter has not deteriorated, the output VOS of the downstream $O_2$ sensor 15 fluctuates with a relatively small amplitude and a relatively long cycle period, therefore, the length of the response curve of VOS becomes small. In contrast with this, if the catalytic converter has deteriorated, the output VOS fluctuates in the manner to the fluctuation of the VOM as shown by the curve (c) in FIG. 9, i.e., VOS fluctuates with a relatively large amplitude and a relatively short cycle period and, thereby, the length of the response curve of VOS becomes large. Therefore, it is considered that the catalytic converter has deteriorated when the length LVOS of the response curve of the output VOS of the downstream $O_2$ sensor becomes larger than a predetermined value. In this embodiment, as explained later, the catalytic converter is determined as being deteriorated when the ratio between the length of the output signal response curve of the downstream $O_2$ sensor 15 (LVOS) and the length of the output signal response curve of the upstream $O_2$ sensor 13 (LVOM), i.e., LVOS/LVOM becomes larger than or equal to a predetermined value. The reason why the ratio LVOS/LVOM is used instead of the length LVOS is that the change in the fluctuation of the upstream air-fuel ratio is compensated by using the ratio LVOS/LVOM and, thereby, the accuracy of the determination of deterioration increases.

However, as understood from the above explanation, in order to determine deterioration of the catalytic converter accurately, the conditions of the exhaust gas flowing into the catalytic converter must be in a condition such that the fluctuation of the downstream air-fuel ratio of a deteriorated catalytic converter becomes large while the fluctuation of the downstream air-fuel ratio of a normal catalyst stays small. In other words, the conditions of the exhaust gas flowing into the catalytic converter must be controlled in such a manner that a deteriorated catalytic converter releases all the absorbed oxygen within the period in which the air-fuel ratio of the exhaust gas flowing into the catalytic converter is rich (i.e., within the rich period) while a normal catalytic converter does not release all the absorbed oxygen with in the rich period.

The amount of oxygen released from the catalytic converter is determined by the conditions of the exhaust gas flowing into the catalytic converter such as the length of the rich period, the degree of richness and the flow rate of the exhaust gas, as explained later. Therefore, in order to determine deterioration of the catalytic converter accurately, the conditions of the exhaust gas flowing into the catalytic converter must be controlled so that the amount of oxygen released from the catalytic converter within the rich period (which is determined by the conditions of the exhaust gas flowing into the catalytic converter) is larger than the maximum oxygen absorbing capacity of a deteriorated catalytic converter and, at the same time, smaller than the maximum oxygen absorbing capacity of a normal capacity. If the amount of oxygen released from the catalytic converter is larger than the maximum oxygen absorbing capacity of a normal catalytic converter, the fluctuation of the downstream air-fuel ratio of the normal catalytic converter, as well as the fluctuation of the downstream air-fuel ratio of the deteriorated catalytic converter becomes large and, thereby, a normal catalytic converter is incorrectly determined as being deteriorated. On the contrary, if the amount of oxygen released from the catalytic converter during the rich period is smaller than the maximum oxygen absorbing capacity of the deteriorated catalytic converter, the deteriorated catalytic converter, as well as the normal catalytic converter releases only a part of the absorbed oxygen within the rich period. Therefore, both the fluctuations of the downstream air-fuel ratios of a deteriorated catalytic converter and a normal catalytic converter become small and, thereby, a deteriorated catalytic converter is incorrectly determined as being normal.

In this embodiment, to solve these problems, the amount of the oxygen released from the catalytic converter is calculated in accordance with the conditions of the exhaust gas flowing into the catalytic converter, and the conditions of the exhaust gas are feedback controlled in such a manner that the calculated amount of the oxygen released from the catalytic converter becomes a predetermined target value suitable for determination of deterioration of the catalytic converter.

As explained before, the amount of the oxygen released from the catalytic converter during the rich period (hereinafter, referred to as "the nominal oxygen amount") is determined by the conditions of the exhaust gas, i.e., (1) the degree of richness of the exhaust gas, (2) the flow rate of the exhaust gas and (3) the length of the rich period. Therefore, if these three conditions are controlled simultaneously, the nominal oxygen amount can be precisely controlled to a desired value. In this embodiment, to simplify the control, the determination of deterioration is carried out during an idle operation of the engine. During the idle operation, the flow rate of the exhaust gas is approximately constant and it is not necessary to control the above condition (2). In this embodiment, therefore, the nominal oxygen amount is controlled at a constant value by changing the length of the rich period in accordance with the degree of richness of the exhaust gas flowing into the catalytic converter during the idle operation of the engine.

Figure 10A:
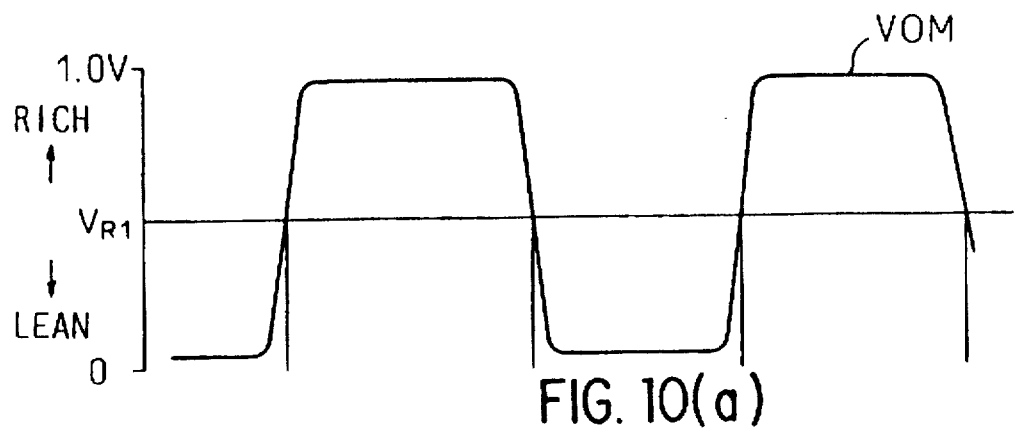
FIG. 10 illustrates the principle for the oxygen amount control used in the embodiment in FIG. 1.
Figure 10B:
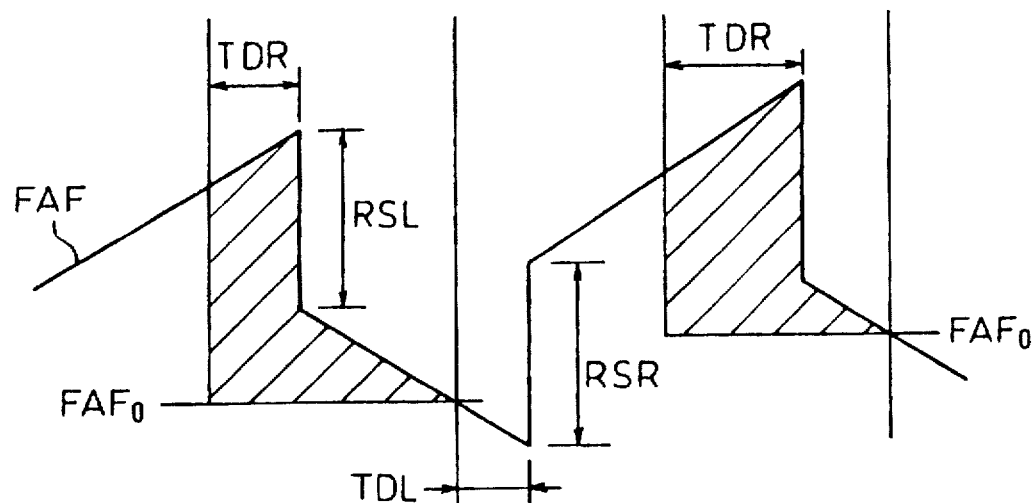

FIG. 10 illustrates the method used in this embodiment to control the nominal oxygen amount. The curves (a) and (b) in FIG. 10 shows the response curves of the output VOM of the upstream $O_2$ sensor 13 and the air-fuel ratio correction factor FAF, respectively, when the first air-fuel ratio control (FIGS. 3 and 4) is carried out. As explained before, it is considered that the nominal oxygen amount increases in proportion to the degree of richness of the exhaust gas if the flow rate and the length of the rich period of the exhaust gas are constant. Further, it is also considered that the nominal oxygen amount increases in proportion to the length of the rich period if the flow rate and the degree of richness of the exhaust gas are constant. The degree of richness of the exhaust gas is expressed by the amount of surplus fuel supplied to the engine. Therefore, it is considered that the degree of richness increases in proportion to the amount (FAF−$FAF_0$), where $FAF_0$ is a value of the air-fuel ratio correction factor FAF corresponding to the stoichiometric air-fuel ratio. Namely, the nominal oxygen amount is considered to be proportional to the product of the value (FAF−$FAF_0$) and the length of the rich period, more precisely, the temporal integration of the value (FAF−$FAF_0$) during the rich period. In order to calculate the temporal integration of the value (FAF−$FAF_0$), it is necessary to determine the value $FAF_0$ which is the value of FAF corresponding to the stoichiometric air-fuel ratio. In this embodiment, the value $FAF_0$ is determined by the method explained below.

As shown by the curves (a) and (b) in FIG. 10, the value of FAF decreased step-wise by the amount RSL when the delay time TDR has elapsed after VOM changed from a lean condition to a rich condition, and thereafter decreases gradually by the amount KIL every time the first air-fuel ratio feedback control routine is executed. Since the air-fuel ratio of the exhaust gas at the moment VOM changes from a rich condition to a lean condition, or vice versa, is considered to be the stoichiometric air-fuel ratio, it is assumed in this embodiment that the value of FAF at the moment VOM changes from a rich condition to a lean condition is equal to $FAF_0$. On this assumption, the value obtained by the temporal integration of (FAF−$FAF_0$) is expressed by the hatched area in FIG. 10.

Further, as understood from the curve (b) in FIG. 10, the rich period can be controlled by changing the value of the rich delay time TDR. Therefore, in this embodiment, the hatched area in FIG. 10 is calculated based on the values of FAF and VOM every time VOM changes from a rich condition to a lean condition, and the rich delay time TDR is feedback controlled in such a manner that the calculated area (the hatched area in FIG. 10) becomes a predetermined target value.

The target value of the hatched area in this embodiment is set in such a manner that the nominal oxygen amount (which is proportional to the hatched area) becomes smaller than the maximum oxygen absorbing capacity of a normal catalytic converter and larger than the same of a deteriorated catalytic converter. Since this target value changes in accordance with the type of the catalytic converter and the degree of deterioration at which the catalytic converter should be determined as being deteriorated, the target value is determined by an experiment using the actual engine and catalytic converter.

Figure 11:
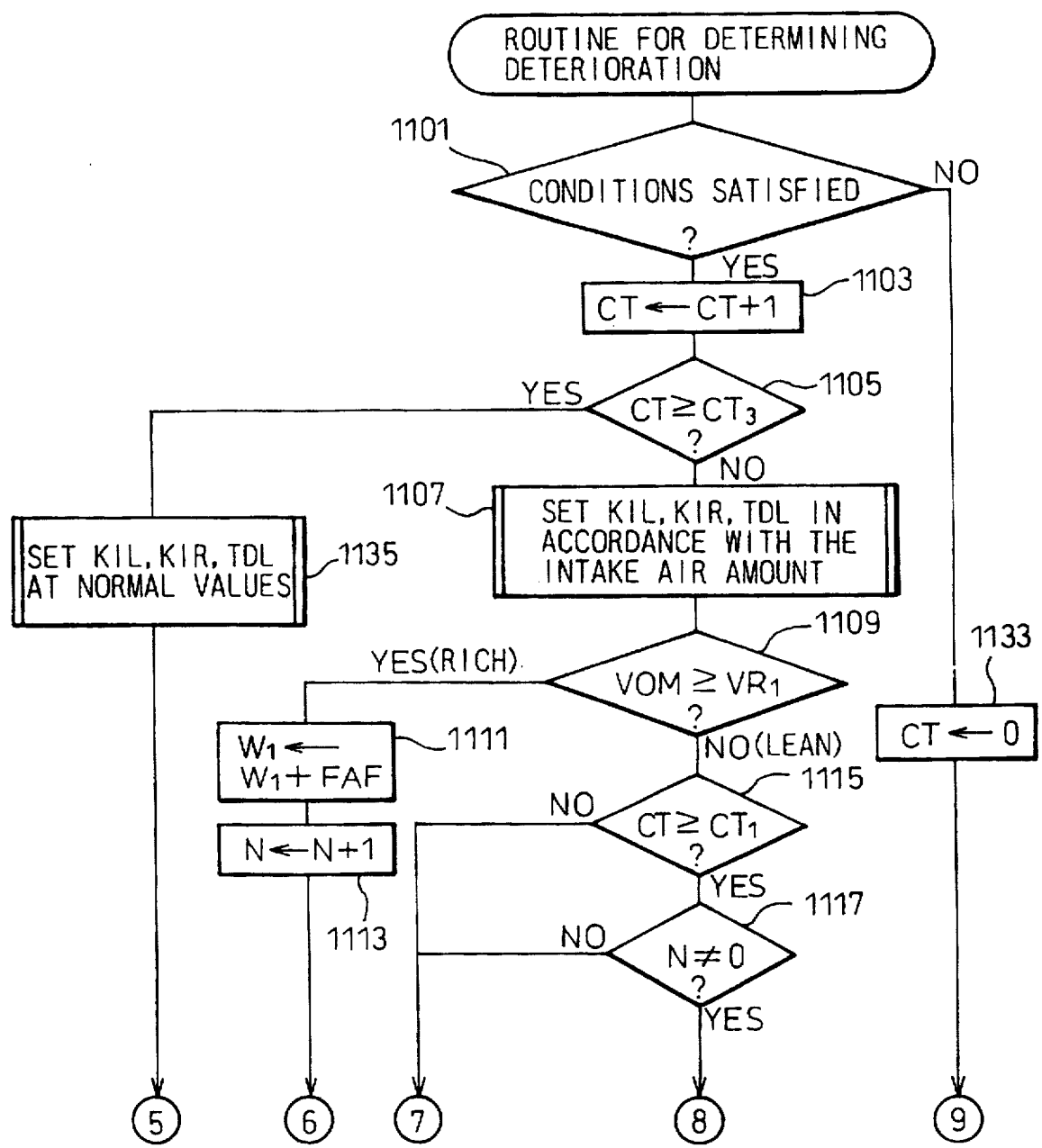
FIGS. 11 and 12 are a flowchart illustrating an embodiment of the routine for determining the deterioration of the catalytic converter.
Figure 12:
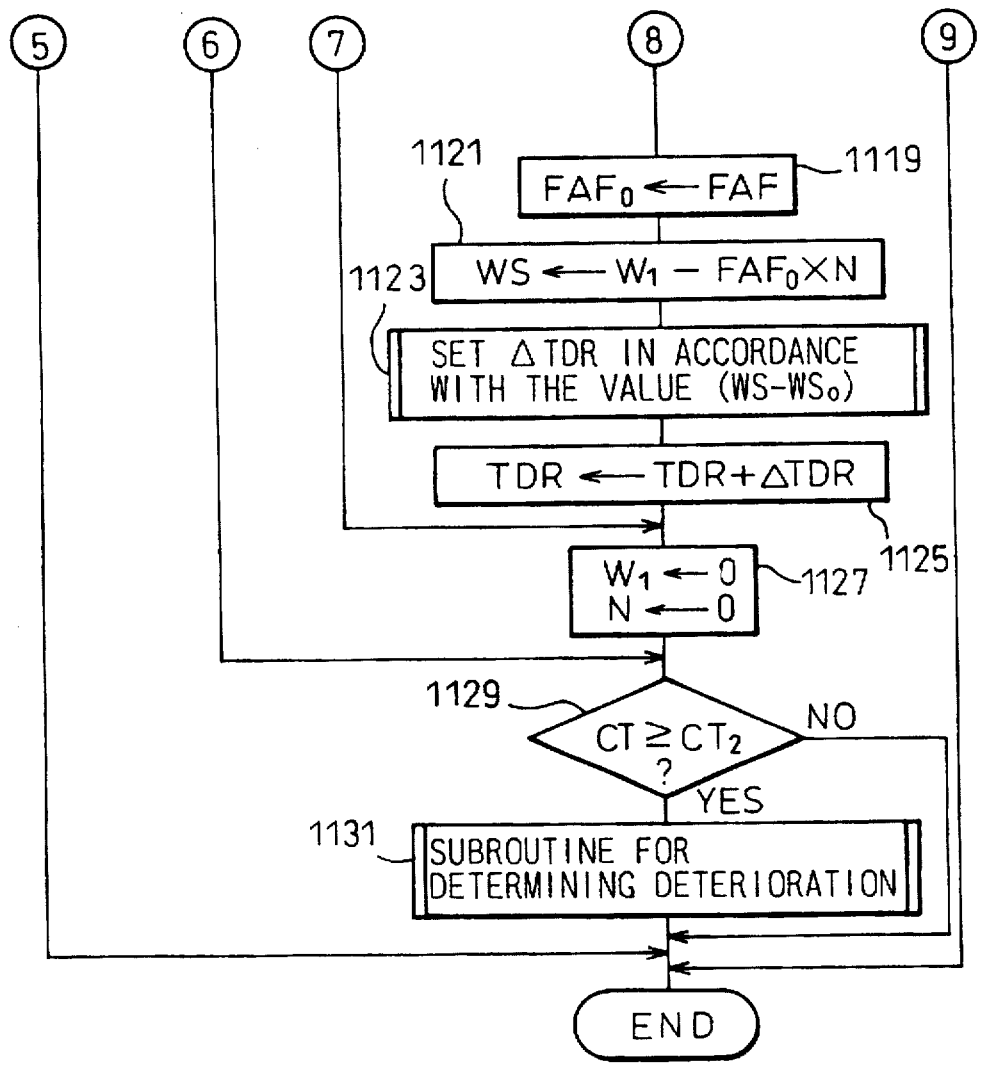

FIGS. 11 and 12 illustrates an example of the routine for determining the deterioration of the catalytic converter in this embodiment. This routine is processed by the control circuit 10 at predetermined intervals.

In FIG. 11, at step 1101, it is determined whether the conditions for carrying out the determination of deterioration is satisfied. The conditions tested at step 1101 are; (1) the first air-fuel ratio control routine (FIGS. 3 and 4) is being executed; (2) the engine is operated in an idle condition; (3) the second air-fuel ratio control routine (FIGS. 5 and 6) is interrupted; (4) the engine operation is stable.

The above condition (1) is required since the determination of deterioration must be carried out when the engine air-fuel ratio is controlled by the first air-fuel ratio control as explained before. This condition is determined based on whether the value of the flag XMFB (FIG. 4, steps 324 and 325) is 1. The above condition (2) is required because the nominal oxygen amount must be controlled in the condition in which the flow rate of the exhaust gas is nearly constant. This condition is determined based on whether the LL signal from the idle switch 17 is ON (LL=1).

The above condition (3) is required for controlling the nominal oxygen amount precisely. In this embodiment, the nominal oxygen amount is controlled by adjusting the length of the rich period in accordance with the degree of richness of the exhaust gas. However, the length of the rich period changes in accordance with the values of RSR and RSL. Therefore, in order to control the nominal oxygen amount precisely, the determination of deterioration must be carried out when the second air-fuel ratio control, which changes the values of RSR and RSL, is interrupted.

The above condition (4) is also required for controlling the nominal oxygen amount when the flow rate of the exhaust gas is constant. In this embodiment, it is determined that the engine operation is stable when the change in the intake air amount of the engine since the routine was last executed is smaller than a predetermined value. Alternatively, this condition may be determined based on the changes in the engine speed instead of the intake air amount.

If any of the conditions (1) through (4) are not satisfied at step 1101, the routine proceeds to step 1133 to clear the value of a counter CT, and after that, the routine terminates without carrying out the determination of deterioration. If all of the condition (1) through (4) are satisfied at step 1101, the routine proceeds to step 1103 to increase the value of the counter CT by 1, and at step 11105 to determine whether the value of the counter CT, after it is increased, reaches a predetermined value $CT_3$. The value $CT_3$ is set at a value larger than the values $CT_1$ and $CT_2$ (steps 1115 and 1129) explained later, and corresponds to the time sufficient to complete the determination of deterioration. If $CT \geq CT_3$ at step 1105, since this means that the determination is completed, the routine proceeds to step 1135 which reset the values of the factors KIL, KIR and TDL used in the first air-fuel ratio control routine at the values in the normal operation (i.e., the operation when the determination of deterioration is not carried out). As explained later, the factors KIL, KIR and TDL are fixed at constant values during the determination of deterioration, and these factors are reset at values in the normal operation after the determination has completed. Therefore, when the determination has completed, the first air-fuel ratio control is performed in the normal manner.

If $CT < CT_3$ at step 1105, since this means that the determination is being carried out, the factors KIL, KIR and TDL are fixed at constant values determined in accordance with the intake air amount at step 107 to facilitate the control of the nominal oxygen amount. In this embodiment, as explained later, the rich period is controlled by changing the value of the factor TDR in order to control the nominal oxygen amount. Therefore, it is preferable to set the rate of change in the value of FAF as small as possible to facilitate the control of the nominal oxygen amount. To achieve this, KIR and KIL are set to smaller constant value as the intake air amount becomes larger. Further, in order to determine deterioration of the catalytic converter accurately, the catalytic converter is preferably saturated with the absorbed oxygen during the period in which the air-fuel ratio of the exhaust gas is lean. Namely, the period in which the air-fuel ratio is lean is preferably set sufficiently long to ensure the saturation of the catalytic converter with the absorbed oxygen. Therefore, in this embodiment, the factor TDL is set at larger constant value as the intake air amount becomes larger.

After setting the values of KIL, KIR and TDL in accordance with the intake air amount at step 1107, the routine reads the A/D converted value of the output signal VOM of the upstream $O_2$ sensor 13 at step 1109, and determines whether VOM is a rich signal (i.e., whether $VOM \geq V_{R1}$). If VOM is a rich signal, the cumulated value W, of the air-fuel ratio correction factor FAF is calculated at step 1111, and the value of a counter N is increased by 1 at step 1113. The values of $W_1$ and N are cleared at step 1127 in FIG. 12 when output signal VOM is a lean signal. Therefore, $W_1$ calculated at step 1111 represents the accumulated value of FAF during the rich period, and value of the counter N represents the number of the execution of the accumulating calculation (step 1111) during the rich period. After executing steps 1111 and 1113, the routine proceeds to step 1129 in FIG. 12. The steps 1129 and thereafter are explained later.

When VOM is a lean signal at step 1109, the routine proceeds to step 1115 which determines whether the value of the counter CT has reached a predetermined value $CT_1$, and if $CT < CT_1$, the values of $W_1$ and N are cleared at step 1127 in FIG. 12. Namely, steps 1119 through 1125, in which the value of TDR is adjusted, are not executed until the time $CT_1$ has elapsed since the conditions in step 1101 are satisfied, in order to ensure that the stable operation of the engine continues. If $CT \geq CT_1$ at step 1115, the routine proceeds to step 1117 to determine whether or not the value of the counter N is 0, and if N=0, the values of $W_1$ and N are cleared at step 1127. If $N \neq 0$ at step 1117, steps 1119 and thereafter in FIG. 12 are executed. Since the value of the counter N is increased at step 1113 when VOM is rich, and cleared at step 1127 when VOM is lean, the value of the counter N at step 1117 is always 0 except when the routine is executed immediately after VOM has changed from a rich signal to a lean signal. Therefore, the steps 1119 through 1125, i.e., adjusting of the value of TDR, is performed only once every time VOM changes from a rich signal to a lean signal.

In FIG. 12, at step 1119, the present value of FAF (i.e., the value of FAF when VOM has changed from a rich signal to a lean signal) is stored as $FAF_0$ (FIG. 10), and the hatched area in FIG. 10 is calculated at step 1121 by $WS = W_1 - FAF_0 \times N$. As explained before, the hatched area WS, in itself, is a value obtained by the temporal integration of the value ($FAF - FAF_0$). However, since the value of FAF when VOM changed from a lean signal to a rich signal is used as $FAF_0$ in this embodiment, the value of $FAF_0$ is not determined until the rich period ends. Therefore, the cumulated value of FAF (i.e., the temporal integration of FAF) is calculated before the value of $FAF_0$ is determined in this embodiment, and the area WS is calculated when the value of $FAF_0$ is determined, by subtracting $FAF_0 \times N$ (N is a number of execution of cumulating calculation of FAF) from the accumulated value of FAF.

After calculating WS at step 1121, a correction amount $\Delta TDR$ is determined at step 1123 in accordance with the difference between the calculated area (i.e., the calculated nominal oxygen amount) WS and a predetermined value $WS_0$. $WS_0$ is a predetermined target value of the hatched area in FIG. 12, i.e., a target value of the nominal oxygen amount. The value of TDR is determined by adding the correction amount $\Delta TDR$ to the present value of TDR. The correction factor $\Delta TDR$ in this embodiment is set in such a manner that the value of $\Delta TDR$ takes larger positive value as the difference ($WS - WS_0$) becomes a larger negative value, and takes larger negative value as ($WS - WS_0$) becomes a larger positive value. Therefore, if ($WS - WS_0$) is a positive value, i.e., if the calculated nominal oxygen amount is larger than the target value, the value of TDR used in the next execution of the first air-fuel ratio feedback control is decreased by $\Delta TDR$. This causes both the value of FAF immediately before it is decreased by RSL (FIG. 10) and the rich period to decrease and, thereby, the hatched area in FIG. 10 becomes smaller. Similarly, if ($WS - WS_0$) is a negative value, i.e., if the calculated nominal oxygen amount is smaller than the target value, the value of TDR is increased by $\Delta TDR$ and, this causes the hatched area in FIG. 10 to increase. Therefore, by executing the steps 1119 to 1125, the hatched area in FIG. 10 becomes a target value $WS_0$, i.e., the nominal oxygen amount becomes a target value. The values of $WS_0$ and $\Delta TDR$ changes in accordance with the type of the engine as well as the type and the size of the catalytic converter, therefore, actual values of $WS_0$ and $\Delta TDR$ are determined by an experiment using an actual engine and catalytic converter. After adjusting the value of TDR at steps 1119 through 1125, values $W_1$ and N are cleared at step 1127.

Steps 1129 and 1131 are steps for determining the deterioration of the catalytic converter. At step 1129, it is determined whether the value of the counter CT has reached a predetermined value $CT_2$. If CT is smaller than $CT_2$, the routine terminates without carrying out the determination. The value of $CT_2$ corresponds to a time sufficiently long for the actual nominal oxygen amount to converge to the target value under control by steps 1119 through 1125. If the time $CT_2$ has elapsed since the conditions in step 1101 were satisfied, i.e., if it is considered that the nominal oxygen amount has converged to the target value, a subroutine for determining the deterioration of the catalytic converter is executed at step 1131.

Figure 13:
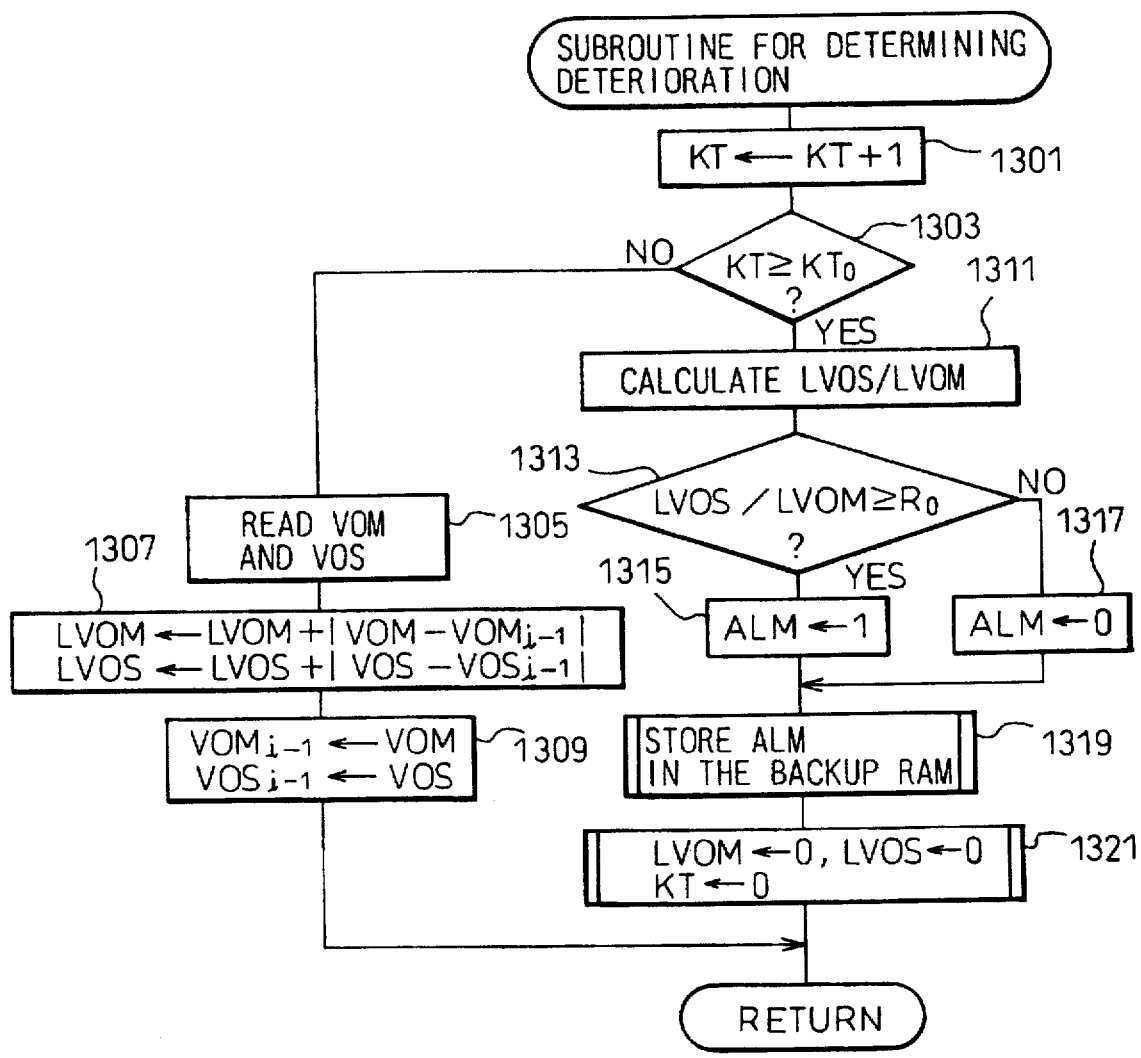
FIG. 13 is a flowchart illustrating an embodiment of the subroutine for determining the deterioration of the catalytic converter.

FIG. 13 shows a flowchart of the subroutine executed at step 1131 in FIG. 12. When the subroutine starts, at step 1301 in FIG. 13, the value of a counter KT is increased by 1. In this embodiment, the determination of deterioration of the catalytic converter is carried out based on the lengths of the output response curves of the upstream $O_2$ sensor 13 and the downstream $O_2$ sensor 15 in a predetermined period. The counter KT is used for measuring this period. At step 1303, it is determined whether the value of the counter KT has reached a predetermined value $KT_0$. In this embodiment, $KT_0$ is set at a value corresponding to about 20 seconds, i.e., the value of $KT_0$ corresponds to the number of times that the routine in FIGS. 11 and 12 is executed in 20 seconds. As explained below, this subroutine calculates the lengths of the output signal response curves of the upstream and downstream $O_2$ sensors in a 20-second period, and determines deterioration of the catalytic converter based on the calculated lengths.

Figure 14:
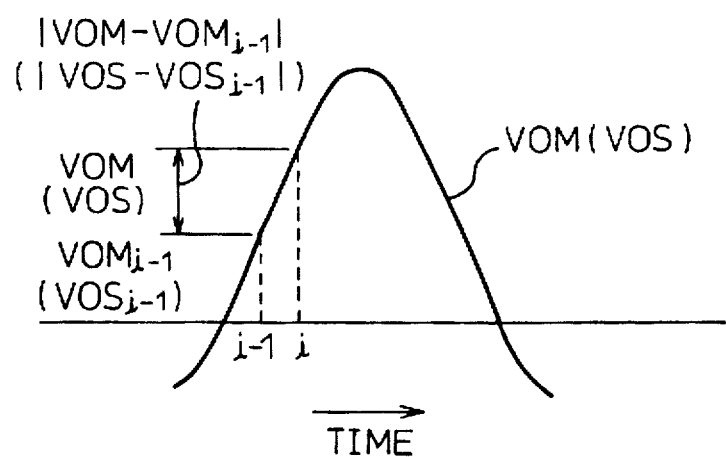
FIG. 14 is a diagram illustrating the method for calculating the length of the output signal response curve of the $O_2$ sensors.
Figure 15A:
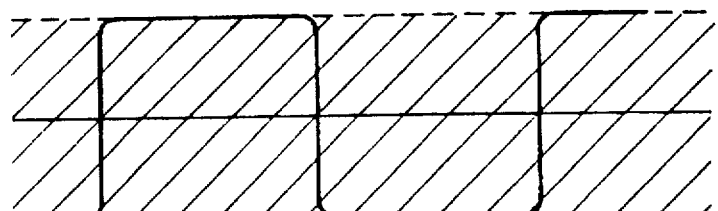
FIG. 15 is a diagram illustrating a principle of the detection of deterioration of the catalytic converter which is different from that of FIG. 13.
Figure 15B:
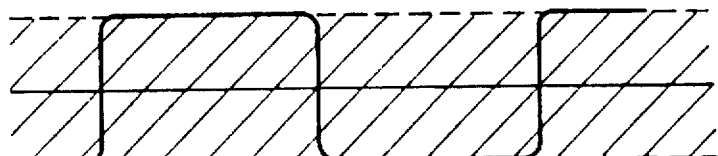
Figure 15C:
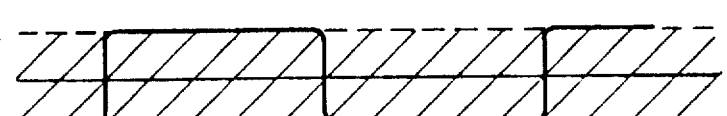
Figure 15D:
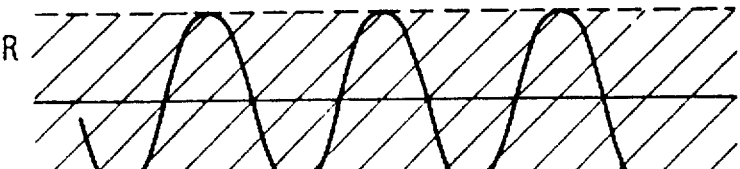
Figure 15E:
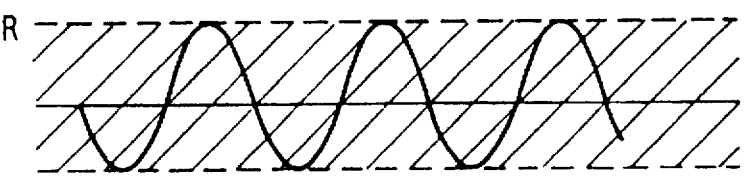
Figure 15F:
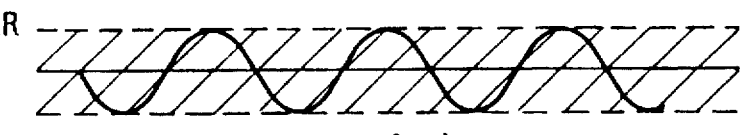

Until the value of the counter KT reaches $KT_0$ at step 1303, LVOM and LVOS which are the lengths of the output signal response curves of upstream $O_2$ sensor 13 and the downstream $O_2$ sensor 15, respectively, are calculated at steps 1305 through 1309. The lengths LVOM and LVOS are calculated as accumulated values of $|VOM-VOM_{i-1}|$ and $|VOS-VOS_{i-1}|$, respectively. $VOM_{i-1}$ and $VOS_{i-1}$ are the values of VOM and VOS, respectively, when the routine was last executed (refer to FIG. 14). Namely, at step 1305, the outputs VOM and VOS are read from the respective $O_2$ sensors 13 and 15, and the accumulated values of $|VOM-VOM_{i-1}|$ and $|VOS-VOS_{i-1}|$ are calculated at step 1307 by the following formula.

$$LVOM=LVOM+|VOM-VOM_{i-1}|, \text{ and}$$

$$LVOS=LVOS+|VOM-VOS_{i-1}|$$

After calculating LVOM and LVOS, the values of $VOM_{i-1}$ and $VOS_{i-1}$ are renewed to prepare for the next execution of the subroutine, and the subroutine terminates.

When the value of the counter KT reaches $KT_0$ at step 1303, the routine proceeds to step 1311 to calculate the ratio LVOS/LVOM using the values LVOS and LVOM calculated at steps 1305 through 1309. Then, at step 1313, the ratio LVOS/LVOM is tested to determine whether it is larger than or equal to a predetermined value $R_0$.

As explained before, when the nominal oxygen amount is maintained at a suitable constant value, a deteriorated catalytic converter releases all the absorbed oxygen during the rich period and, thereby, the output VOS of the downstream $O_2$ sensor 15 fluctuates in the manner similar to that of the output VOM of the upstream $O_2$ sensor 13. This causes the length LVOS of the output response curve of the downstream $O_2$ sensor to increase. Therefore, the ratio LVOS/LVOM also increases and approaches to 1.0 when the catalytic converter has deteriorated. In this embodiment, when the ratio LVOS/LVOM becomes larger than, or equal to, the predetermined value $R_0$, the catalytic converter is determined as being deteriorated. The value of $R_0$ ($R_0<1.0$) is determined in accordance with the degree of deterioration of the catalytic converter at which the catalytic converter should be determined as being deteriorated, and is preferably determined by, for example, an experiment using an actual catalytic converter.

If LVOS/LVOM$\geq R_0$ at step 1313, the value of an alarm flag ALM is set at 1 at step 1315. If LVOS/LVOM$<R_0$ at step 1313, the value of the alarm flag ALM is set at 0 at step 1317. When the value of the alarm flag ALM is set at 1, the alarm 19 is activated by a not shown routine to inform the driver of the automobile of the deterioration of catalytic converter. After setting the value of the flag ALM, the value of ALM is stored in the backup RAM 106 of the control circuit 10 at step 1319 to prepare for future repair and inspection, and the values of LVOS, LVOM and KT are cleared at step 1321. After executing step 1311 through 1321, this subroutine terminates.

According to the present embodiment, since the nominal oxygen amount is maintained at a suitable constant value when the determination of deterioration of the catalytic converter is performed, deterioration of the catalytic converter is precisely determined without being affected by the conditions of the exhaust gas flowing into the catalytic converter.

Next, another embodiment of the subroutine for determining the deterioration of the catalytic converter which is executed at step 1131 is explained. In the subroutine in FIG. 13, deterioration of the catalytic converter is determined based on the fact that the length LVOS of the output signal response curve of the downstream $O_2$ sensor 13 becomes small when the catalytic converter has deteriorated. However, if the downstream $O_2$ sensor 15 itself has deteriorated, the length LVOS may become small even if the catalytic converter is not deteriorated. When the $O_2$ sensor 13 has deteriorated, the amplitude of the fluctuation of the output signal becomes small. Since the length LVOS of the output signal becomes smaller as the amplitude of the fluctuation of the output signal is smaller, the value of the ratio LVOS/LVOM may become smaller than $R_0$ even if the catalytic converter has not deteriorated when the downstream $O_2$ sensor has deteriorated. This may cause an error in the determination in which a normal catalytic converter is incorrectly determined as being deteriorated. In the embodiment explained hereinafter, this problem is solved by determining the deterioration of the catalytic converter by estimating the length of the output signal response curve of the downstream $O_2$ sensor 13 in an imaginary condition in which the catalytic converter is removed from the exhaust gas passage.

In this embodiment, the length of the output signal response curve of the downstream $O_2$ sensor 15 in the imaginary condition (hereinafter, it is referred to as "the nominal length of the output signal response curve of the downstream $O_2$ sensor" to differentiate it from the actual length of the output signal response curve) based on the length LVOM of the upstream $O_2$ sensor, and values obtained by temporal integration of the differences between the maximum and minimum values in each cycle of the fluctuations of the upstream and downstream $O_2$ sensors. The method for estimating the nominal length of the output signal response curve of the downstream $O_2$ sensor 15 is explained hereinafter with reference to FIG. 15.

FIG. 15 schematically illustrates the change in the output signal response curve of the downstream $O_2$ sensor 15 in accordance with deterioration of the downstream $O_2$ sensor and the catalytic converter 12. In FIG. 15, the curves (a), (b) and (c) shows change in the output signal response curve of the downstream $O_2$ sensor 15 when the catalytic converter is normal, and the curve (a) shows the case in which the $O_2$ sensor 15 is normal. The curves (b) and (c) show the cases in which the $O_2$ sensor 15 has deteriorated to a medium degree, and to a large degree, respectively. Similarly, the curves (d), (e) and (f) in FIG. 15 show the cases in which the $O_2$ sensor is normal (the curve (d)), has deteriorated to a medium degree (the curve (e)) and has deteriorated to a large degree (the curve (f)), respectively, when the catalytic converter has deteriorated. As seen from FIG. 15, the value obtained by the temporal integration of the difference between the maximum and the minimum values of the output signal response curve of the downstream $O_2$ sensor 15 (the area of the hatched portion in FIG. 15, and hereinafter referred to as "the integrated difference") and the length of output signal response curve of the downstream $O_2$ sensor 15 both become smaller as deterioration of the downstream $O_2$ sensor 15 proceeds, regardless of the degree of deterioration of the catalytic converter. Further, when comparing the curves (a) and (d), (b) and (e), (c) and (f), respectively, it would be understood that the value of the integrated difference (the area of the hatched portion in FIG. 15) changes solely in accordance with the degree of deterioration of the downstream $O_2$ sensor 15, i.e., the value of the integrated difference is the same regardless of the degree of deterioration of the catalytic converter when the degree of deterioration of the downstream $O_2$ sensor is the same.

In this embodiment, it is assumed that the value of the integrated difference is proportional to the length of the output signal response curve. On this assumption, the following relationship is obtained.

$$LVOS_2 = LVOS_1 \times IVOS_2/IVOS_1 \tag{1}$$

LVOS represents the lengths of the output signal response curve of the $O_2$ sensor 15, and IVOS represents the integrated difference of the output signal response curve of the $O_2$ sensor 15. The suffixes 1 and 2 indicate different levels of deterioration of $O_2$ sensor 15. Namely, the above relationship indicates that when the degree of deterioration of the $O_2$ sensor changed, the length LVOS after the degree of deterioration has changed (i.e., $LVOS_2$) is expressed by the product of the length LVOS before the degree of deterioration changes (i.e., $LVOS_1$) and the ratio of the integrated difference between the before and after the degree of deterioration has changed (i.e., $IVOS_2/IVOS_1$).

The nominal length $LVOS_0$ of the downstream $O_2$ sensor 15 is the length LVOS of the downstream $O_2$ sensor 15 when the catalytic converter 12 is removed from the exhaust gas passage while maintaining the current degree of deterioration of the downstream $O_2$ sensor, and is calculated by the following method.

If the degrees of deterioration of the upstream sensor 13 and the downstream $O_2$ sensor 15 are exactly the same (this degree of deterioration is indicated by the suffix 1), when the catalytic converter is removed from the exhaust gas passage, the values LVOS and IVOS of the downstream $O_2$ sensor (with suffix 1, expressed by $LVOS_1$ and $IVOS_1$) become the same as LVOM and IVOM of the upstream $O_2$ sensor, respectively ($LVOS_1$=LVOM, $IVOS_1$=IVOM). Assuming that the degree of deterioration of the downstream $O_2$ sensor has changed from this condition, to the current degree of deterioration (the degree of deterioration after the change is indicated by the suffix 2), $LVOS_1$ of the downstream $O_2$ sensor changes to $LVOS_2$ by the change in deterioration of the downstream $O_2$ sensor. However, the value of the integrated difference of the downstream $O_2$ sensor is only affected by the degree of deterioration of the $O_2$ sensor. Therefore, if the degree of deterioration of the downstream $O_2$ sensor does not change, the value of the integrated difference of the downstream $O_2$ sensor is maintained at the same value even if the catalytic converter is removed from the exhaust gas passage. Therefore, the value of the integrated difference of the downstream $O_2$ sensor after the change is the same as current value of integrated difference of the downstream $O_2$ sensor ($IVOS_2$=IVOS).

Namely, it is considered that $LVOS_1$=LVOM, $IVOS_1$=IVOM and $IVOS_2$=IVOS.

The nominal length $LVOS_0$ of the downstream $O_2$ sensor 15 is, as explained above, the length LVOS of the downstream $O_2$ sensor 15 when the catalytic converter 12 is removed from the exhaust gas passage while maintaining the current degree of deterioration of $O_2$ sensor (i.e., $LVOS_0$= $LVOS_2$).

Therefore, the above relationship (1) is modified as follows.

$$LVOS_0 = LVOM \times IVOS/IVOM \tag{2}$$

In the extreme condition, in which the catalytic converter has deteriorated to the maximum degree, the $O_2$ storage capability of the catalytic converter is completely lost, and the output signal of the downstream $O_2$ sensor fluctuates in the same manner as that of the upstream $O_2$ sensor. Since the nominal length $LVOS_0$ is the length LVOS of the downstream $O_2$ sensor when the catalytic converter is removed from the exhaust gas passage while maintaining the current degree of deterioration of the downstream $O_2$ sensor, the nominal length $LVOS_0$ is the same as the length LVOS when the catalytic converter has deteriorated to the maximum degree while maintaining the current degree of deterioration of the downstream $O_2$ sensor.

Since LVOS increases as the degree of deterioration of the catalytic converter proceeds, the ratio of LVOS (the length corresponding to the current degree of deterioration of the downstream $O_2$ sensor and the current degree of deterioration of the catalytic converter) and $LVOS_0$ (the length corresponding to the current degree of deterioration of the downstream $O_2$ sensor and the maximum degree of deterioration of the catalytic converter) changes in accordance with the current degree of deterioration of the catalytic converter, i.e., $LVOS/LVOS_0$ becomes larger as deterioration of the catalytic converter proceeds, and reaches the value 1.0 when the catalytic converter has deteriorated to the maximum degree. Therefore, the degree of deterioration of the catalytic converter can be determined accurately from the ratio $LVOS/LVOS_0$.

Using the above relationship (2), the ratio $LVOS/LVOS_0$ is expressed by the following formula.

$$LVOS/LVOS_0 = LVOS/\{LVOM \times (IVOS/IVOM)\} = (LVOS/LVOM)/(IVOS/IVOM)$$

Namely, the ratio $LVOS/LVOS_0$ is calculated in accordance with the ratio of current lengths of the output signal response curves of the downstream and the upstream $O_2$ sensors (LVOS/LVOM), and ratio of the current values of the integrated differences of the downstream and the upstream $O_2$ sensors (IVOS/IVOM). Since the value of the ratio $LVOS/LVOS_0$ is not affected by the change in the degree of deterioration of the upstream and the downstream $O_2$ sensors, deterioration of the catalytic converter is precisely determined using the ratio $LVOS/LVOS_0$ regardless of the degree of deterioration of the $O_2$ sensors.

The actual procedure for determining the deterioration of the catalytic converter based on the ratio $LVOS/LVOS_0$ is explained hereinafter with reference to FIGS. 16 through 20.

Figure 16:
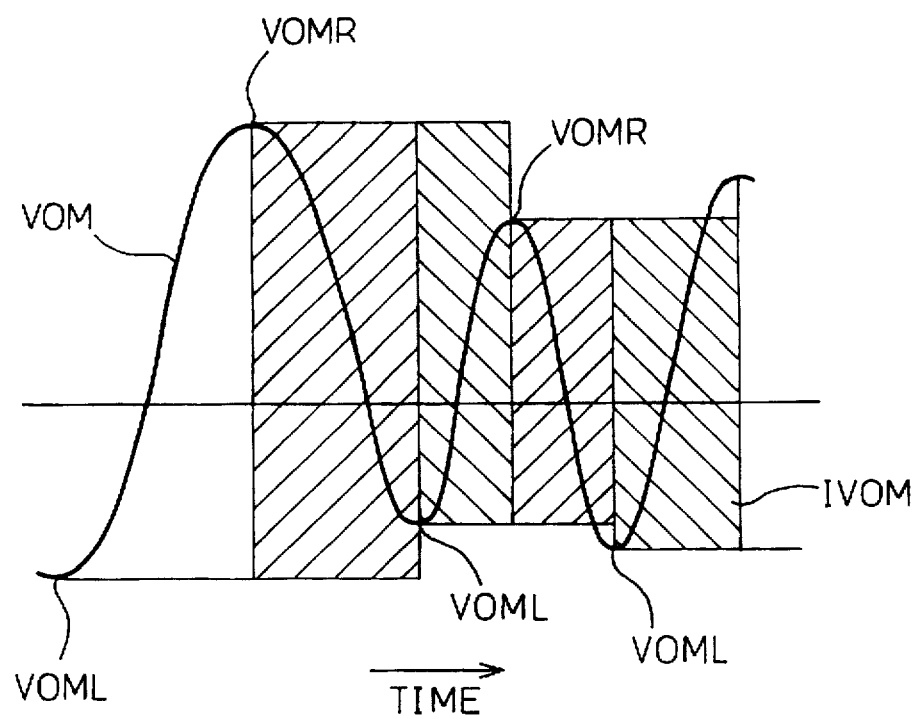
FIG. 16 is a diagram illustrating the method for calculating the temporal integration of the difference between the maximum and the minimum value of the output signal response curve of the $O_2$ sensor.

FIG. 16 explains the procedure for calculating the integrated difference of the output signal response curve of $O_2$ sensors. Though FIG. 16 shows the procedure for calculating the integral difference IVOM of the upstream $O_2$ sensor 13, the integral difference IVOS of the downstream $O_2$ sensor is calculated in exactly the same manner as IVOM. As shown in FIG. 16, the integrated difference of the output signal response curve of $O_2$ sensor is calculated as an area of hatched portions in FIG. 16. In this embodiment, the control circuit 10 determines the crests VOMR and VOML (the maximum and the minimum values) in each cycle of the output signal response curve of the $O_2$ sensor, and calculates the value IVOM by integrating the difference between each adjoining pairs of VOMR and VOML.

Figure 17:
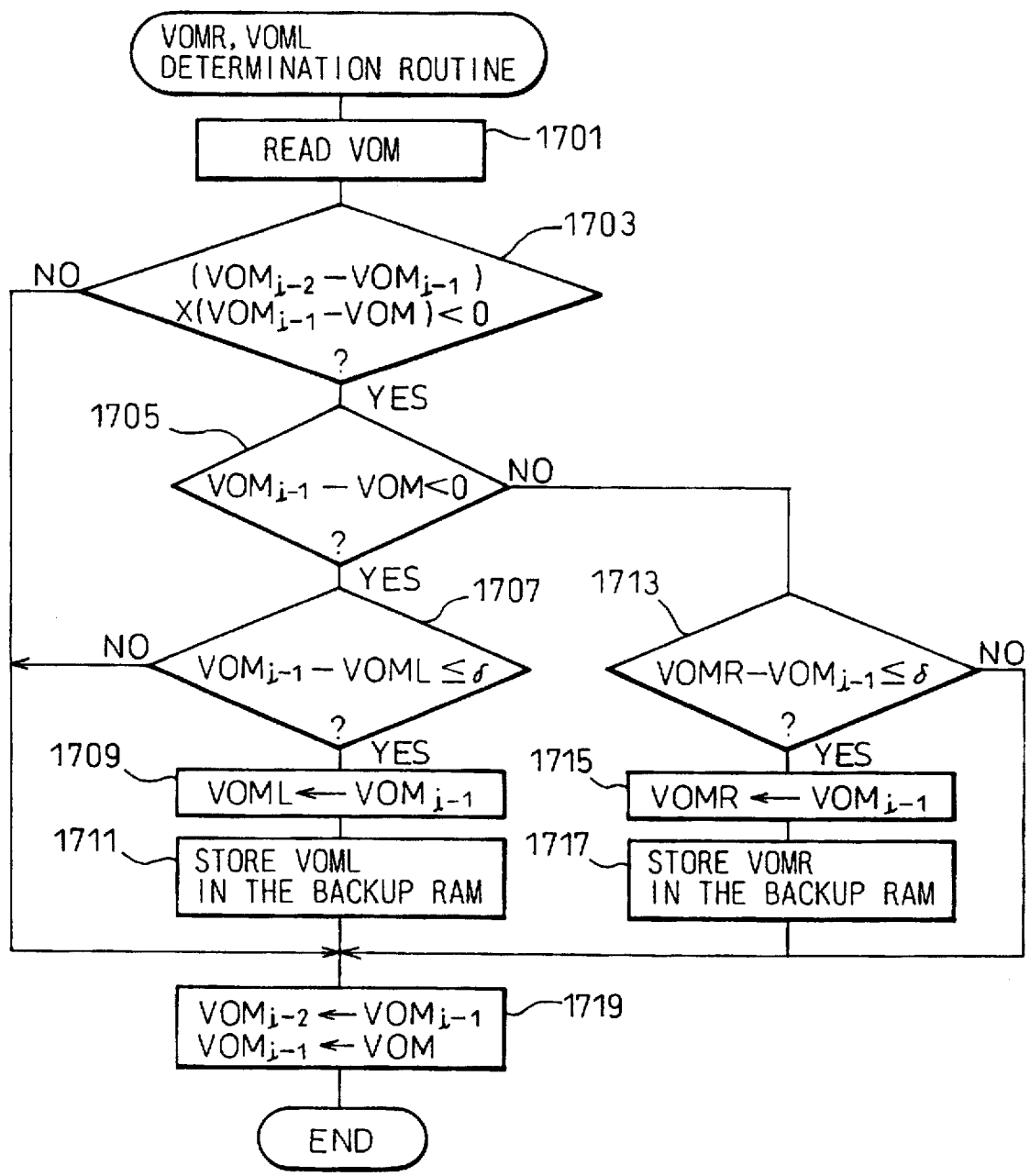
FIG. 17 is a flowchart illustrating the calculation of the maximum and the minimum values of the output signal of the $O_2$ sensor.
Figure 18A:
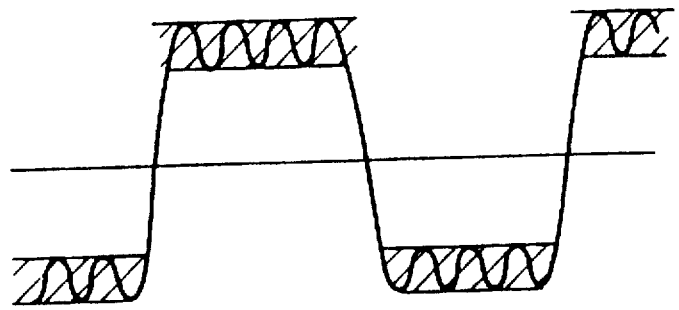
FIG. 18 is a diagram explaining the flowchart in FIG. 17.
Figure 18B:
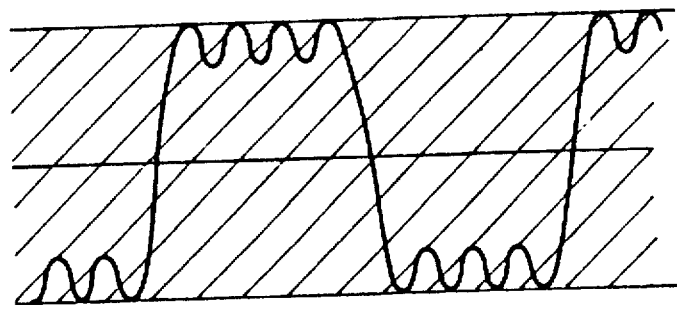
Figure 18C:
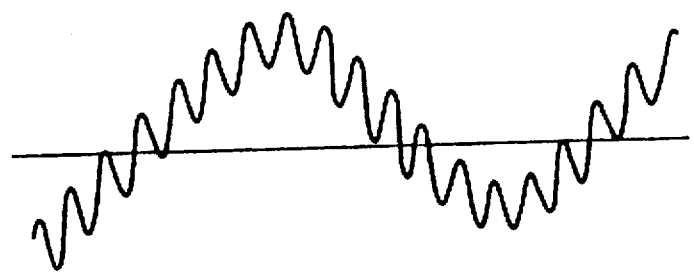
Figure 18D:
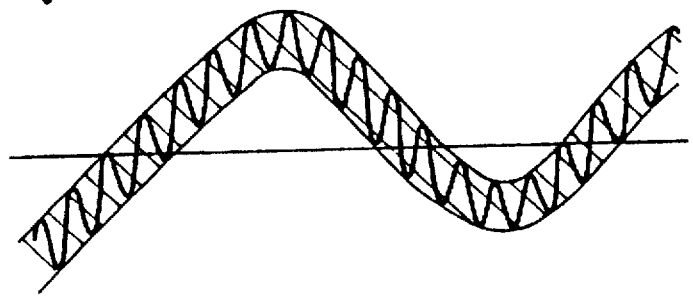

FIG. 17 shows the routine for determining the maximum and the minimum values VOMR and VOML of the output signal of the upstream $O_2$ sensor. Though not shown in the drawing, the maximum and the minimum values VOSR and VOSL of the output signal of the downstream $O_2$ sensor is determined in the same manner as that in FIG. 17. The routine in FIG. 17 is processed by the control circuit 10 at predetermined regular intervals.

In FIG. 17, at step 1701, A/D converted value of the output VOM of the upstream $O_2$ sensor 13 is read from the upstream $O_2$ sensor 13. At step 1703, it is determined whether the inclination of the output signal response curve has changed since the routine was last executed based on VOM, $VOM_{i-1}$ (the value of VOM when the routine was last executed) and $VOM_{i-2}$ (the value of VOM when the routine was executed before the last). If the slope of the response curve has changed at step 1703, i.e., if $(VOM_{i-2}-VOM_{i-1}) \times (VOM_{i-1}-VOM) < 0$, it is considered that the value $VOM_{i-1}$, is the maximum value or the minimum value of the present cycle of fluctuation. The routine proceeds to step 1705 to determine whether $VOM_{i-1}$ is the maximum value or the minimum value based on the inclination $(VOM_{i-1}-VOM)$. If $(VOM_{i-1}-VOM)<0$, this means that the $VOM_{i-1}$ is the minimum value since the output VOM is now increasing. Therefore, the routine proceeds to steps 1707 to 1711 to renew the stored minimum value VOML. Namely, at step 1707, it is determined whether the difference between $VOM_{i-1}$ and the current minimum value VOML is lower than or equal to a predetermined value δ, and only when $VOM_{i-1}-VOML \leq \delta$, is the value of VOML replaced with $VOM_{i-1}$ at step 1709. The renewed value VOML is, then, stored in the backup RAM 106 at step 1711 and the values of $VOM_{i-1}$ and $VOM_{i-2}$ are then renewed to prepare the next execution of the routine at step 1719. Similarly, if $VOM_{i-1}$ is determined as being the minimum value, the value of VOMR is replaced with $VOM_{i-1}$ only when $VOMR-VOM_{i-1} \leq \delta$ (steps 1705, 1713 through 1717).

The reason why the maximum value and the minimum value are renewed only when the difference between the stored values of VOML or VOMR and $VOM_{i-1}$ does not exceed the predetermined value δ is to avoid an error in the determination of VOML and VOMR. When the degree of deterioration of the catalytic converter is medium, the catalytic converter still has some $O_2$ storage capability. Therefore, the response curve of the downstream $O_2$ sensor sometimes becomes the shape as shown by the curve (a) in FIG. 18, i.e., the shape in which the fluctuation of small amplitude is added to the response curve when the catalytic converter is not deteriorated. Further, when both the catalytic converter and the downstream $O_2$ sensor have deteriorated, the response curve of the downstream $O_2$ sensor sometimes becomes the shape as shown by the curve (c) in FIG. 18. Therefore, if VOMR and VOML are replaced with $VOM_{i-1}$ every time VOM reaches the maximum or the minimum value in each fluctuation cycle, for example, the value IVOM is calculated as the area of the hatched portion in the curve (b) in FIG. 18. This causes an error in the determination of deterioration of the catalytic converter. Therefore, to avoid this problem, the stored value of VOML and VOMR are not replaced with $VOM_{i-1}$ when $VOM_{i-1}$ largely deviates from the stored VOML and VOMR in this embodiment. This causes the calculated value of IVOM to be equal to the hatched area in the curve (b) instead of the same in the curve (a), and to the hatched area in the curve (d). Thus, an error in the determination of deterioration is eliminated.

Figure 19:
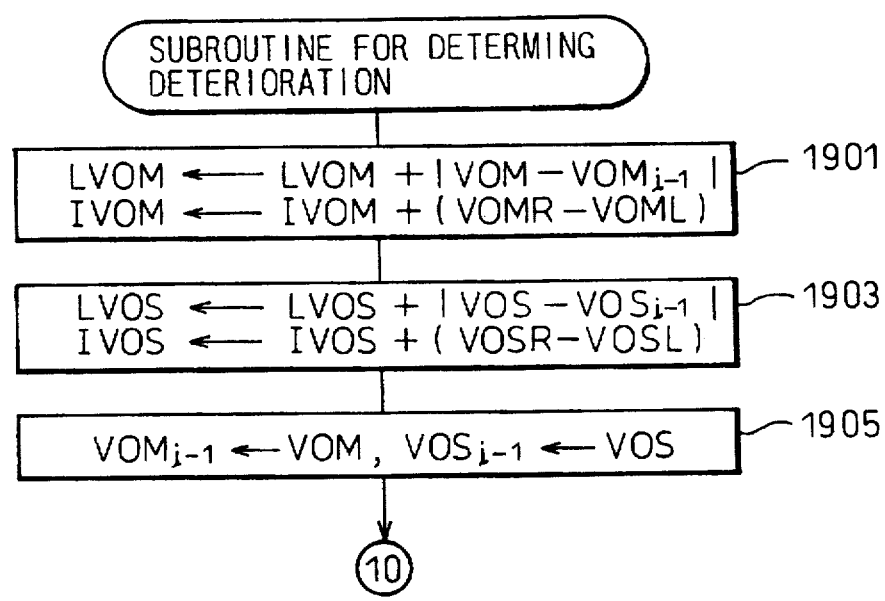
FIGS. 19 and 20 are a flowchart illustrating another embodiment of the subroutine for determining the deterioration of the catalytic converter which is different from the embodiment in FIG. 13.
Figure 20:
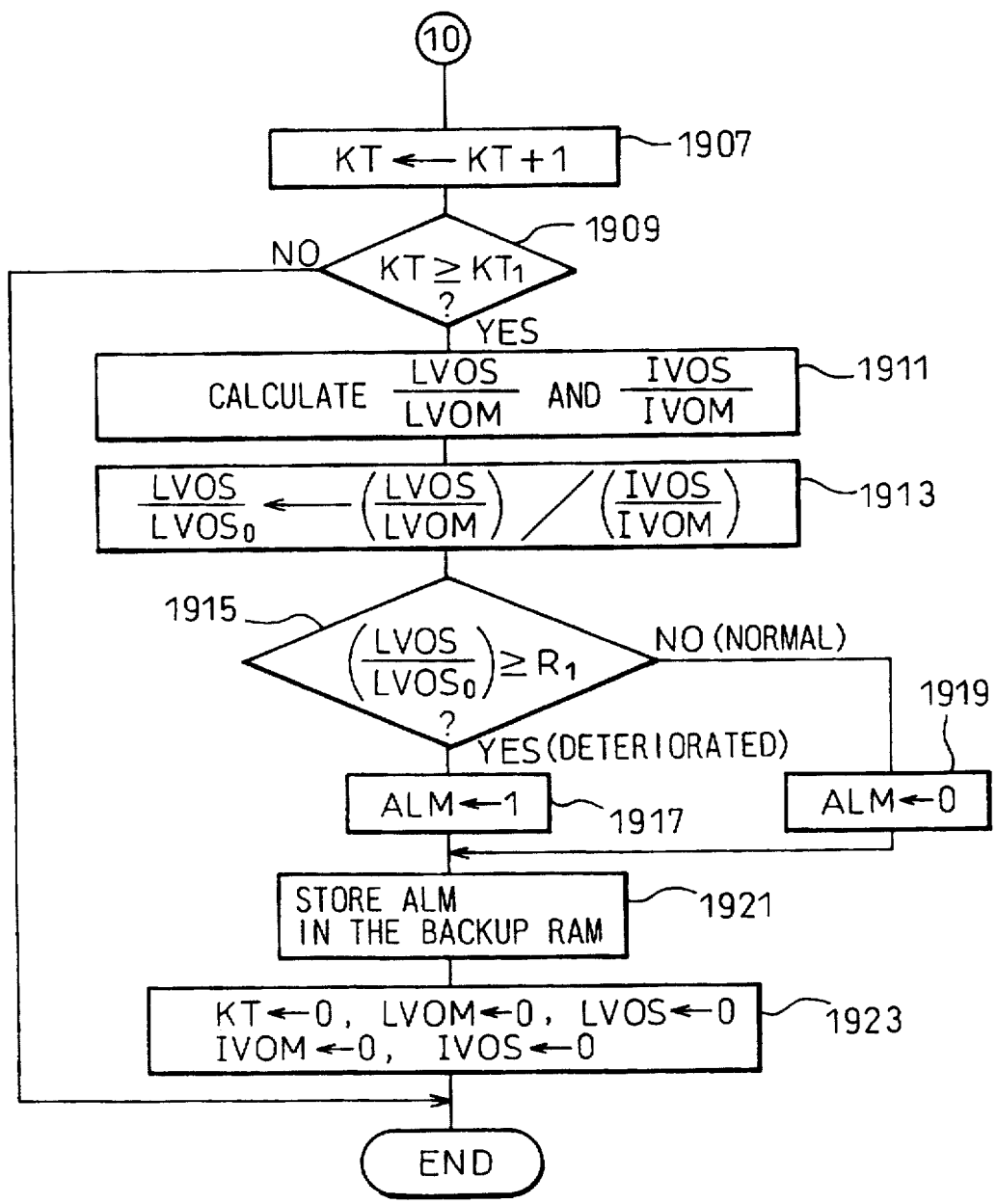

FIGS. 19 and 20 show a flowchart of the subroutine which determines deterioration of the catalytic converter based on the nominal length $LVOS_0$ as explained above. This subroutine is executed at step 1131 in FIG. 12 instead of the subroutine in FIG. 13.

In FIG. 19, steps 1901 and 1903 shows the calculation of the lengths LVOM and LVOS and the integrated differences IVOM and IVOS. The length LVOM and LVOS are calculated in the same manner as those in FIG. 13, step 1307. The integrated differences IVOM and IVOS are calculated as the integrated values of (VOMR−VOML) and (VOSR−VOSL), respectively, in this embodiment. At step 1905, the values of $VOM_{i-1}$ and $VOS_{i-1}$ are renewed to prepare the next execution of the subroutine.

At step 1907 in FIG. 20, the value of the counter KT is increased by 1, and at step 1909, the value of the counter, after it is increased, is tested to determine whether it reaches a predetermined value $KT_1$. If the value of KT is smaller than $KT_1$ at step 1909, the subroutine terminates. The function of the counter KT is same as that in FIG. 13, and $KT_1$ is a value corresponding to about 20 seconds in this embodiment. Namely, the values of LVOS, LVOM, IVOS and IVOM are integrated for approximately 20 seconds.

If $KT \geq KT_1$ at step 1909, the ratios LVOS/LVOM and IVOS/IVOM are calculated at step 1911, and the ratio between LVOS and $LVOS_0$ (the nominal length) is calculated at step 1913 using the ratios LVOS/LVOM and IVOS/IVOM. Then, deterioration of the catalytic converter is determined at step 1915 by comparing the ratio $LVOS/LVOS_0$ with a predetermined value $R_1$. As explained before, the ratio $LVOS/LVOS_0$ becomes larger as deterioration of the catalytic converter proceeds, and reaches 1.0 when the catalytic converter has deteriorated to the maximum degree. $R_1$ is set at the value of $LVOS/LVOS_0$ when the catalytic converter has deteriorated to the degree which practically causes problems. The value $R_1$ is determined by an experiment using the actual catalytic converter.

If $LVOS/LVOS_0 \geq R_1$ at step 1915, i.e., if the catalytic converter is determined as being deteriorated, the subroutine sets the value of the alarm flag ALM at 1 (step 1917) to activate the alarm, and stores the value of the flag ALM to the backup RAM 106 to prepare for repair and inspection. Then, at step 1923, the values of KT, LVOM, LVOS, IVOM and IVOS are cleared. If $LVOS/LVOS_0 < R_1$ at step 1915, since this means that the catalytic converter has not deteriorated to the degree which causes practical problems, the value of the flag ALM is set at 0 at step 1919, and the steps 1921 and 1923 are executed. By determining the deterioration of the catalytic converter by the subroutine in FIGS. 19 and 20, deterioration of the catalytic converter can be determined accurately regardless of deterioration of the $O_2$ sensors.

As explained above, according to the present invention, since the air-fuel ratio of the exhaust gas flowing into the catalytic converter is controlled in such a manner that the nominal amount of oxygen released from the catalytic converter is maintained at the value suitable for the determination, the accuracy of the determination of deterioration of the catalytic converter is greatly increased.

I claim:

1. A device for determining deterioration of a catalytic converter having an $O_2$ storage capability and disposed in an exhaust gas passage of an engine comprising:

an upstream air-fuel ratio sensor disposed in an exhaust gas passage of an engine upstream of a catalytic converter for detecting an air-fuel ratio of an exhaust gas upstream of the catalytic converter;

a downstream air-fuel ratio sensor disposed in the exhaust gas passage of the engine downstream of the catalytic converter for detecting the air-fuel ratio of the exhaust gas downstream of the catalytic converter;

air-fuel ratio feedback control means for controlling the air-fuel ratio of the exhaust gas flowing into the catalytic converter based on at least an output signal of the upstream air-fuel ratio sensor in such a manner that the air-fuel ratio of the exhaust gas flowing into the catalytic converter changes between a rich air-fuel ratio and a lean air-fuel ratio compared to stoichiometric air-fuel ratio alternately;

oxygen amount calculating means for calculating the amount of oxygen released from the catalytic converter based on at least the air-fuel ratio of the exhaust gas flowing into the catalytic converter when the air-fuel ratio of exhaust gas flowing into the catalytic converter is rich;

oxygen amount control means for controlling the length of the time period in which the air-fuel ratio of the exhaust gas flowing into the catalytic converter becomes a rich air-fuel ratio in such a manner that the amount of oxygen released from the catalytic converter becomes a predetermined value; and determining means for determining a degree of deterioration of the catalytic converter based on at least an output of the downstream air-fuel ratio sensor when the amount of the oxygen released from the catalytic converter is maintained at said predetermined value.

2. A device according to claim 1, wherein said oxygen amount calculating means calculates the amount of the oxygen released from the catalytic converter based on the value obtained by a temporal integration of the amount of the deviation of the air-fuel ratio flowing into the catalytic converter from the stoichiometric air-fuel ratio.

3. A device according to claim 1, wherein said determining means comprises a means for calculating the length of the output signal response curve of the downstream air-fuel ratio sensor, and determines the degree of deterioration of the catalytic converter based on said length of the output signal response curve of the downstream air-fuel ratio sensor.

4. A device according to claim 1, wherein said determining means comprises:

first integration means for calculating a value obtained by a temporal integration of the difference between the maximum and the minimum values in each cycle of fluctuation of the output signal of the upstream air-fuel ratio sensor;

second integration means for calculating a value obtained by a temporal integration of the difference between the maximum and the minimum values in each cycle of fluctuation of the output signal of the downstream air-fuel ratio sensor;

length calculation means for calculating lengths of the output signal response curves of the upstream air-fuel ratio sensor and the downstream air-fuel ratio sensor;

estimating means for estimating the length of the output signal response curve of the downstream air-fuel ratio sensor in an imaginary condition in which the catalytic converter is considered to be removed from the exhaust gas passage based on said values obtained by the temporal integration of the output signals of the upstream and the downstream sensors calculated by the first and the second integration means and said length of the output signal of the upstream air-fuel ratio sensor calculated by the length calculation means; and means for calculating the degree of deterioration of the catalytic converter based on the estimated length of the output signal of the downstream air-fuel ratio sensor estimated by the estimating means and the length of the output signal of the downstream air-fuel ratio sensor calculated by the length calculation means.

5. A device according to claim 4, wherein said estimating means estimates the length of the output signal of the downstream air-fuel ratio sensor in said imaginary condition as a value obtained by multiplying the length of the output signal of the upstream air-fuel ratio sensor calculated by the length calculation means and the ratio between the values obtained by the temporal integration of the output signals of the downstream air-fuel ratio sensor and the upstream air-fuel ratio sensor.

* * * * *

UNITED STATES PATENT AND TRADEMARK OFFICE
CERTIFICATE OF CORRECTION

PATENT NO. : 5,732,553
DATED : March 31, 1998
INVENTOR(S) : Mitsutani

It is certified that error appears in the above-identified patent and that said Letters Patent is hereby corrected as shown below:

Column 4, line 58, change "Fig. 7 is" to read -- Figs. 7 (a) – 7 (d) are --.

Column 4, line 60, change "Fig. 8 schematically illustrates" to read -- Fig. 8 (a) – (c) illustrate --.

Column 4, line 64, change "Fig. 9 shows" to read -- Figs. 9 (a) – (c) show --.

Column 5, line 1, change "Fig. 10 illustrates" to read -- Figs. 10 (a) – (b) illustrate –

Column 5, line 12, change "Fig.15 is" to read -- Figs. 15 (a) – (f) are –

Column 5, line 23, change "Fig. 18 is" to read -- Figs. 18 (a) – (b) are --.

Signed and Sealed this

Ninth Day of March, 1999

Attest:

Q. TODD DICKINSON

*Attesting Officer*　　*Acting Commissioner of Patents and Trademarks*